(12) United States Patent
Chen et al.

(10) Patent No.: US 10,499,313 B2
(45) Date of Patent: Dec. 3, 2019

(54) EFFICIENT HYBRID RESOURCE AND SCHEDULE MANAGEMENT IN TIME SLOTTED CHANNEL HOPPING NETWORKS

(71) Applicant: Convida Wireless, LLC, Wilmington, DE (US)

(72) Inventors: Zhuo Chen, Claymont, DE (US); Lijun Dong, San Diego, CA (US); Chonggang Wang, Princeton, NJ (US); Quang Ly, North Wales, PA (US); Xu Li, Plainsboro, NJ (US); Guang Lu, Thornhill (CA); Yanyan Han, Lafayette, LA (US); Shamim Akbar Rahman, Cote St. Luc (CA)

(*) Notice: Subject to any disclaimer, the term of this patent is extended or adjusted under 35 U.S.C. 154(b) by 31 days.

(21) Appl. No.: 15/532,136

(22) PCT Filed: Dec. 2, 2015

(86) PCT No.: PCT/US2015/063332
§ 371 (c)(1),
(2) Date: Jun. 1, 2017

(87) PCT Pub. No.: WO2016/089944
PCT Pub. Date: Jun. 9, 2016

(65) Prior Publication Data
US 2017/0273002 A1  Sep. 21, 2017

Related U.S. Application Data

(60) Provisional application No. 62/087,022, filed on Dec. 3, 2014.

(51) Int. Cl.
*H04W 40/24* (2009.01)
*H04L 12/703* (2013.01)
(Continued)

(52) U.S. Cl.
CPC .......... *H04W 40/246* (2013.01); *H04L 45/127* (2013.01); *H04L 45/28* (2013.01); *H04L 45/44* (2013.01); *H04W 40/04* (2013.01)

(58) Field of Classification Search
None
See application file for complete search history.

(56) References Cited

U.S. PATENT DOCUMENTS

| 2010/0074273 A1 | 3/2010 | Ji | |
|---|---|---|---|
| 2014/0281541 A1* | 9/2014 | Cherian | H04W 12/06 713/169 |

(Continued)

OTHER PUBLICATIONS

Wireless Systems for Industrial Automation: Process Control and Related Applications, ISA100.11a-2009, 2009, 817 pages.

(Continued)

*Primary Examiner* — Kevin C. Harper
*Assistant Examiner* — Derrick V Rose
(74) *Attorney, Agent, or Firm* — BakerHostetler

(57) ABSTRACT

The present application is directed to a computer-implemented device for reserving a path in a network. The device includes a non-transitory memory operably coupled to a processor. The processor is configured to perform the instruction of sending a path computation request to a backbone router via a routing protocol path. The processor is also configured to perform the instruction of receiving a computation reply from the backbone router path based upon the request. The processor is also configured to perform the instruction of assigning a soft cell on the path between the source and the destination device. The application is also directed to a computer-implemented device for reserving a path between a source device and destination device.

19 Claims, 19 Drawing Sheets

(51) Int. Cl.
*H04W 40/04* (2009.01)
*H04L 12/721* (2013.01)

(56) References Cited

U.S. PATENT DOCUMENTS

2015/0023186 A1* 1/2015 Vasseur ................. H04L 43/103
 370/252
2015/0023205 A1* 1/2015 Vasseur .................. H04L 45/02
 370/254
2015/0089081 A1* 3/2015 Thubert ................. H04L 45/12
 709/239

OTHER PUBLICATIONS

Wang et al., "6TiSCH Operation Sublayer (6top); draft-wang-6tisch-6top-00.txt", Internet Engineering Task Force, IETF; Standard Working Draft, Internet Society (ISOC) 4, Rue Des Falaises CH-1205 Geneva, Switzerland, Oct. 20, 2013, pp. 1-55.
Vilajosana et al., "Minimal 6TiSCH Configuration; draft-ietf-6tisch-minimal-02.txt", Internet Engineering Task Force, IETF; Standard Working Draft, Internet Society (ISOC) 4, Rue Des Falaises CH-1205 Geneva, Switzerland, Jul. 4, 2014, pp. 1-20.
Thubert et al., "IETF 6TSCH: Combining IPv6 Connectivity with Industrial Performance", 2013 Seventh International Conference on Innovative Mobile and Internet Services in Ubiquitous Computing, IEEE, Jul. 3, 2013, pp. 541-546.
Thubert et al., "An Architecture for IPv6 over the TSCH mode of IEEE 802.15.4e; draft-ietf-6tisch-architecture-04.txt", Internet Engineering Task Force, IETF; Standard Working Draft, Internet Society (ISOC) 4, Rue Des Falaises CH-1205 Geneva, Switzerland, Oct. 27, 2014, pp. 1-31.
The P2P-RPL Routing Protocol for IPv6 Sensor Networks: Testbed Experiments, 19th International Conference on Software, telecommunications and Computer Networks (SoftCOM), Sep. 2011, 7 pages.
Internet Control Message Protocol Version 6 (ICMPv6) Parameters, http://www.iana.org/assignments/icmpv6-parameters/icmpv6-parameters.xhtml, Aug. 30, 2018, 10 pages.
Industrial Communication Networks—Wireless Communication Network and Communication Profiles—WirelessHART; IEC62591 International Standard, Edition 1.0, Apr. 2010, 23 pages.
IETF RFC-6775, Neighbor Discovery Optimization for Ipv6 Over Low-Power Wireless Personal Area Networks (6LoWPANs), Nov. 2012, 55 pages.
IETF RFC-6568, Design and Application Spaces for IPv6 Over Low-Power Wireless Personal Area Networks (6LoWPANs), Apr. 2012, 28 pages.
IETF RFC-6282, "Compression Format for IPv6 Datagrams over IEEE 802.15.4-Based Networks", Sep. 2011, 24 pages.
IETF RFC-6206, The Trickle Algorithm, Mar. 2011, 14 pages.
IETF RFC-4944, Transmission of IPv6 Packets Over IEEE 802.15.4 Networks, Sep. 2007, 30 pages.
IETF RFC-4443, Internet Control Message Protocol (ICMpv6) for the Internet Protocol Version 6 (IPv6) Specification, Mar. 2006, 25 pages.
IETF RFC-4291, IP Version 6 Addressing Architecture, Feb. 2006, 26 pages.
IETF draft-ietf-core-coap-18, Constrained Application Protocol (CoAP), Jun. 28, 2013, 118 pages.
IETF draft-ietf-6tisch-minimal-02, "Minimal 6TiSCH Configuration", Jul. 4, 2014, 20 pages.
IETF draft-ietf-6tisch-architecture-01; An Architecture for IPv6 over the TSCH Mode of IEEE 802.15.4e, Feb. 14, 2014, 24 pages.
IETF draft-chakrabarti-nordmark-6man-efficient-nd-05, "IPv6 Neighbor Discovery Optimizations for Wired and Wireless Networks", Feb. 14, 2014, 36 pages.
IETF 6TiSCH Operation Sublayer (6top) Interface; draft-ietf-6tisch-6top-interface-00; Mar. 27, 2014, 30 pages.
IETF 6TiSCH On-the-Fly Scheduling, draft-dujovne-6tisch-on-the-fly-03, Jul. 4, 2014, 14 pages.
IEEE Standard 802.15.4e, Part 15.4: Low-Rate Wireless Personal Area Networks (LR-WPANs), Sep. 5, 2011, 314 pages.
IEEE Standard 802.15.4e, Part 15.4: Low-Rate Wireless Personal Area Networks (LR-WPANs), Apr. 16, 2012, 225 pages.

* cited by examiner

EFFICIENT HYBRID RESOURCE AND SCHEDULE MANAGEMENT IN TIME SLOTTED CHANNEL HOPPING NETWORKS

CROSS-REFERENCE TO RELATED APPLICATIONS

This application is a National Stage Application filed under 35 U.S.C. § 371 of International Application No. PCT/US2015/063332, filed Dec. 2, 2015, which claims priority to U.S. Provisional Application No. 62/087,022, filed Dec. 3, 2014, the disclosure of which is incorporated herein by reference in its entirety.

BACKGROUND

In the field of networking topology, channel hopping strategies have been employed to improve reliability for low power and lossy networks (LLN)s. Namely, time slotted channel hopping (TSCH) is where time is divided into several timeslots. These timeslots are grouped into one or more slot frames with each slot frame continuously repeating over time.

Generally, in centralized resource and schedule management schemes, all LLN devices report their TSCH schedule to the central controller of the network. The central controller calculates the optimal track, otherwise known as a path, from source to the destination and notifies LLN devices on the track to reserve resources. However, this may cause high traffic load around the central controller when the size of the network grows due to large amounts of information contained in the LLN device's periodic TSCH report. Accordingly, track reservation requests may not be delivered to the central controller promptly. Moreover, the track reservation request may not be promptly processed.

Separately, conventional routing protocols, e.g., IPv6 Routing Protocol for Low-Power and Lossy Networks (RPL), are inefficient to find the shortest path in IETF IPv6 over the TSCH mode of IEEE 802.15.4e (6TiSCH) networks. While the default routing protocol RPL may certainly find a path between a source and a destination along a Destination Oriented Direct Acyclic Graph (DODAG) via backbone routers (BRs), this path may cause transmission delays. Meanwhile, channels of the BRs may become saturated. Moreover, the RPLs may also impair the benefit of a track that is employed for reducing the delay of point-to-point traffic (P2P). That is, when the network grows, these protocols, e.g., P2P-RPLs, may suffer from one or more problems. These may include high energy consumption at the source LLN device, large delay and overhead to build a DODAG, and a Track not being guaranteed for reservation along the found path Further, existing protocols fail to support decentralized track reservation in 6TiSCH networks. That is, even if the source LLN device may find a well-performed, e.g., the shortest, path to the destination, no decentralized procedures exist to support track reservation in a 6TiSCH.

SUMMARY

This summary is provided to introduce a selection of concepts in a simplified form that are further described below in the Detailed Description. This Summary is not intended to limit the scope of the claimed subject matter. The foregoing needs are met, to a great extent, by the present application directed to a method for reserving a track between a source and a destination. Preferably, the track is reserved in a decentralized system.

In one aspect of the application, a method for reserving a track between a source and a destination is described. The method includes a step of providing a source device. The method also includes a step of sending a path computation request to a backbone router via a routing protocol path. Moreover, the method includes a step of receiving a computation reply from the backbone router via the routing protocol path based upon the request. Further, the method includes a step of assigning a soft cell on the Track between the source and the destination device.

In another aspect of the application a computer-implemented method for reserving a track between a source and a destination device via a backbone router is described. The method includes a step of sending a path computation request from the source device to a backbone router via a routing protocol path. The method also includes a step of receiving a computation reply from the backbone router based upon the request. The method also includes a step of sending a track assignment request to the destination device including unscheduled slot information of one or more intermediate devices in the track. Further, the method includes a step of receiving a track assignment confirmation message from the destination device including an acceptable allocation of non-overlapped soft cells.

In yet another aspect of the application, a computer-implemented method for reserving a track between a source and a destination via a backbone router is described. The method includes a step of receiving a track reservation request from the source device to reserve cells along the track. The method also includes a step of sending a unicast track assignment query message to an intermediate device and the destination device on the track to obtain unscheduled slot information. The method also includes a step of receiving a track assignment query reply message from an intermediate device and the destination device on the track. Further, the method includes a step of determining feasibility of the track based upon information in the track reservation request and the received track assignment query reply messages.

In a further aspect of the application, there is described a computer-implemented device for reserving a track. The device includes a non-transitory memory having instructions stored thereon for reserving a track in a network. The device also includes a processor, operably coupled to the memory. The processor is configured to perform the instructions of (i) sending a path computation request to a backbone router via a routing protocol path; (ii) receiving a computation reply from the backbone router via the routing protocol path based upon the request; and (iii) assigning a soft cell on the track between the source and the destination device.

There has thus been outlined, rather broadly, certain embodiments of the invention in order that the detailed description thereof may be better understood, and in order that the present contribution to the art may be better appreciated.

BRIEF DESCRIPTION OF THE DRAWINGS

In order to facilitate a more robust understanding of the application, reference is now made to the accompanying drawings, in which like elements are referenced with like numerals. These drawings should not be construed to limit the application and are intended only to be illustrative.

DETAILED DESCRIPTION OF THE ILLUSTRATIVE EMBODIMENTS

Figure 1:
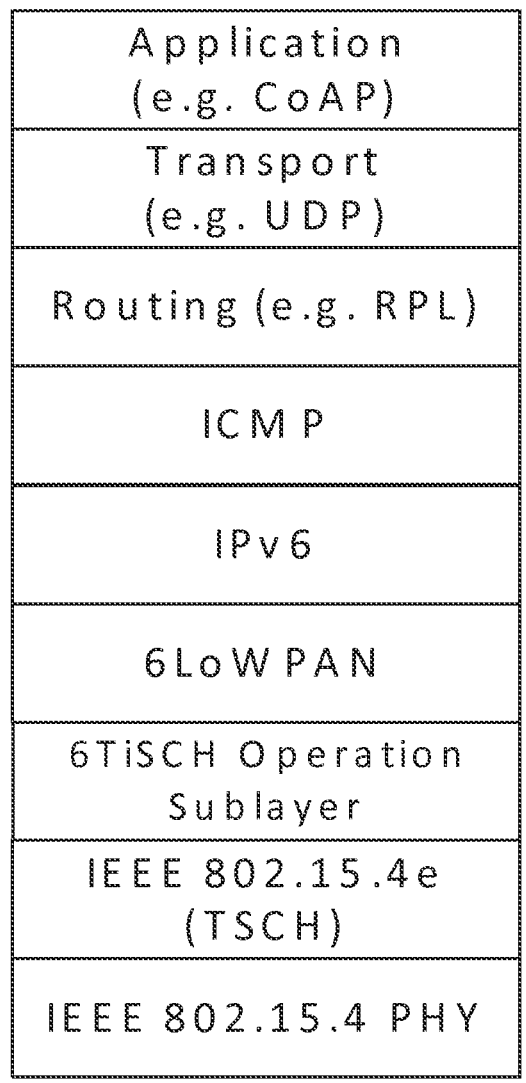
FIG. 1 illustrates a 6TiSCH operation sublayer in a 6TiSCH protocol stack according to an embodiment of the application.

A detailed description of the illustrative embodiment will be discussed in reference to various figures, embodiments and aspects herein. Although this description provides detailed examples of possible implementations, it should be understood that the details are intended to be examples and thus do not limit the scope of the application.

Reference in this specification to "one embodiment," "an embodiment," "one or more embodiments," "an aspect" or the like means that a particular feature, structure, or characteristic described in connection with the embodiment is included in at least one embodiment of the disclosure. Moreover, the term "embodiment" in various places in the specification is not necessarily referring to the same embodiment. That is, various features are described which may be exhibited by some embodiments and not by the other.

According to the application, a novel technique is provided that allows the source LLN device to reserve resources along the shortest track, otherwise known as a path, to a destination LLN device. Moreover, the application describes a low overhead procedure for LLN devices to proactively report their neighbor information to their BR by enhancing RPLs in order to locate the shortest track between the source and destination. Further, novel schemes are described to reserve resources along a path in a 6TiSCH network.

TSCH Mode of IEEE 82.15.4e

Time Slotted Channel Hopping (TSCH) is one of the medium access modes specified in IEEE 802.15.4e. The following properties exist in the TSCH mode of IEEE 802.15.4e: (i) time is divided into several Timeslots; (ii) timeslots are grouped into one or more Slot frames; and (iii) a Slot frame continuously repeats over time. For instance, Table 1 shows a TSCH Schedule. The x-axis is the Timeslot offset and the y-axis is the Channel Offset. Accordingly, a LLN device may use different channels in different Timeslots. A single element in the TSCH Slot frame, named as a "Cell", is identified by a Timeslot Offset value and a Channel Offset value. Typically, a given cell may be a scheduled cell, e.g., Tx, Rx, or TxRx, or an unscheduled cell as shown in Table 1. Moreover, a "Hard cell" is a scheduled cell that is configured by a centralized controller in the network meaning the cell cannot be further configured and/or modified by the LLN device itself. Alternatively, a "Soft cell" is a scheduled cell that is only configured by the LLN device itself and can be further configured by either the LLN device or by the centralized controller. However, once a soft cell is configured by the centralized controller, it will become a hard cell.

In order to receive or transmit packets, a LLN device needs to obtain a Schedule. Primarily, the LLN device may transmit a packet at Timeslot 0 using Channel 0. Next, the LLN device turns on its radio to receive an incoming packet at Timeslot 1 over Channel 1. The LLN device may transmit or receive a packet simultaneously at Timeslot 2 using Channel 15. The LLN device may turn off its radio in an unscheduled cell at Timeslot 99.

TABLE 1

| Offset Channel | Timeslot | | | | |
|---|---|---|---|---|---|
| Offset | 0 | 1 | 2 | ... | 99 |
| 0 | TxRxShare | | | | Unscheduled |
| 1 | | Rx | | | Unscheduled |
| ... | | | | | Unscheduled |
| 15 | | | TxRx | | Unscheduled |

6TiSCH Network

A 6TiSCH network architecture generally includes a plurality of constrained devices that use TSCH mode of 802.15.4e as a Medium Access Control (MAC) protocol. The IETF 6TiSCH Working Group specifies protocols for addressing network layer issues of 6TiSCH networks. To manage a TSCH Schedule, a 6TiSCH Operation Sublayer (6top) is employed in a 6TiSCH Working Group. As shown in FIG. 1, 6top is a sublayer which is the next-higher layer for IEEE 802.15.4e TSCH MAC. 6top offers both management and data interfaces to an upper layer. For example, 6top offers commands such as READ/CREATE/UPDATE/DELETE to modify its resource, e.g., TSCH Schedule.

Figure 2:
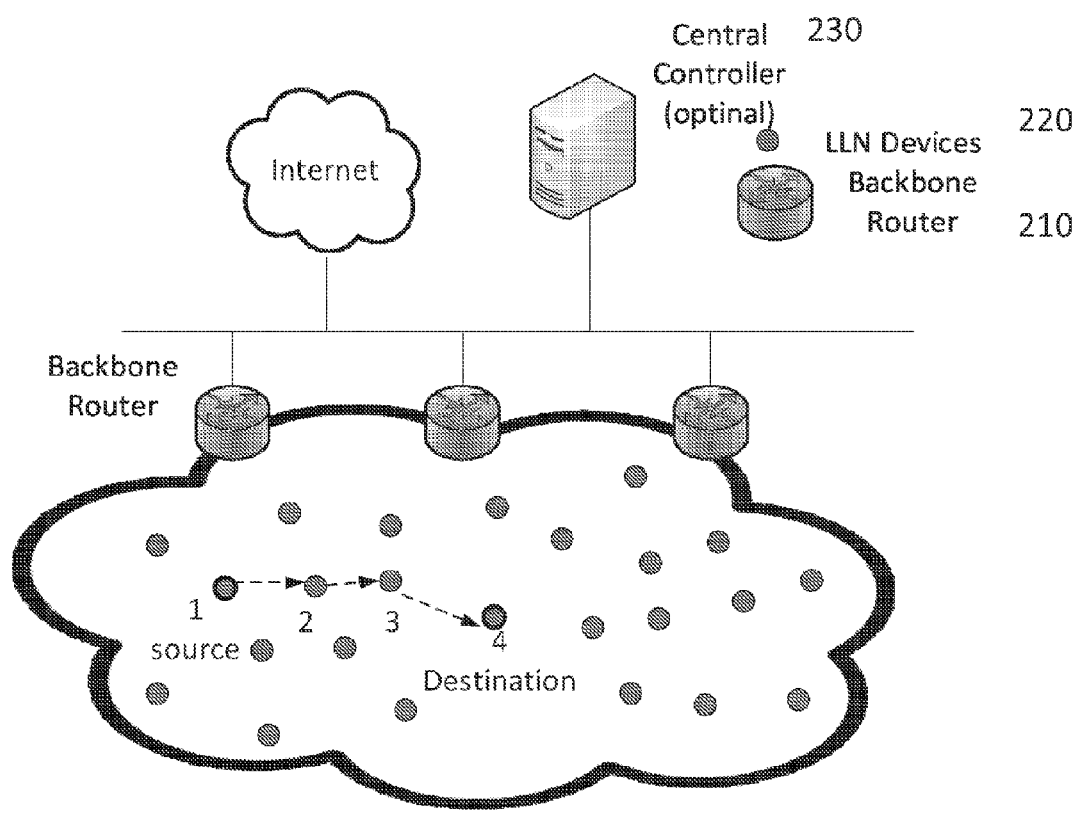
FIG. 2 illustrates architecture of a 6TiSCH network according to an embodiment of the application.

As illustrated in FIG. 2, a 6TiSCH network 200 includes at least a BR 210 and LLN devices 220. The BR is a powerful device located at the border of a 6TiSCH network. The BRs work as a Gateway to connect 6TiSCH network to the Internet. Meanwhile, the LLN devices have constrained resources, e.g., limited power supply, memory, processing capability. They connect to one or more BRs via single hop or multi-hop communications. Due to the limited resources, LLN devices may not be able to support complicated protocols such as Transmission Control Protocol (TCP). However, LLN devices may support network layer protocols such as Internet Control Message Protocols (ICMPs). LLN devices may therefore function as constrained Internet Protocol (IP) routers. LLN devices may not have the ability to compute the routing table of all LLN devices. A 6TiSCH network may be managed by a central controller 230. The central controller has the capability of calculating routing paths between a source and a destination as well as configuring the TSCH Schedule for each of the LLN devices on the path in a centralized way. The central controller may be co-located on the BR or outside of the 6TiSCH network.

Centralized and decentralized schemes may be employed to solve the resource and schedule management issue for multi-hop communications. In the centralized scheme, the central controller can setup Hard Cells in the TSCH Schedule of LLN devices. This enables the multi-hop communications between LLN devices. Alternatively, in decentralized schemes, LLN devices may negotiate and setup Soft Cells in their TSCH Schedule to communicate with each other. The decentralized schemes are more scalable and robust than centralized scheme for resource and schedule management since it does not rely on the central controller of the network.

By configuring the TSCH Schedule of LLN devices on a route, e.g., from LLN device 1 to LLN device 4 as shown in FIG. 2, a track may be reserved to enhance the multi-hop communications between the source and the destination. As shown in Table 2 below, a LLN device on the track knows what cells it should use to receive packets from its previous hop, e.g., LLN device 2 knows the LLN device 1 will transmit a packet in Slot 1 using Channel 0, in addition to knowing what cells it should use to send packets to its next hop, e.g., LLN device 2 knows it shall transmit a packet to LLN device 3 using Slot 2 and Channel 15. By using the track, the throughput and delay of the path between the source and the destination can be guaranteed. This is important for industrial automation and process control.

TABLE 2(a)

TSCH Schedule of LLN device 1

| Offset Channel | Timeslot | | | | |
|---|---|---|---|---|---|
| Offset | 0 | 1 | 2 | ... | 99 |
| 0 | | track 1<br>Tx to LLN<br>device 2 | | | |
| 1 | | | | | |
| ... | | | | | |
| 15 | | | | | |

TABLE 2(b)

TSCH Schedule of LLN device 2

| Offset Channel | Timeslot | | | | |
|---|---|---|---|---|---|
| Offset | 0 | 1 | 2 | ... | 99 |
| 0 | | track 1<br>Rx from LLN<br>device 1 | | | |
| 1 | | | | | |
| ... | | | | | |
| 15 | | | track 1<br>Tx to LLN<br>device 3 | | |

TABLE 2(c)

TSCH Schedule of LLN device 3

| Offset Channel | Timeslot | | | | |
|---|---|---|---|---|---|
| Offset | 0 | 1 | 2 | ... | 99 |
| 0 | | | | | |
| 1 | | | | | |
| ... | | | | | |
| 15 | | | track 1<br>Rx from LLN<br>device 2 | | track 1<br>Tx to LLN<br>device 4 |

TABLE 2(d)

TSCH Schedule of LLN device 4

| Offset Channel | Timeslot | | | | |
|---|---|---|---|---|---|
| Offset | 0 | 1 | 2 | ... | 99 |
| 0 | | | | | |
| 1 | | | | | |
| ... | | | | | |
| 15 | | | track 1<br>Rx from LLN<br>device 3 | | |

Figure 3:
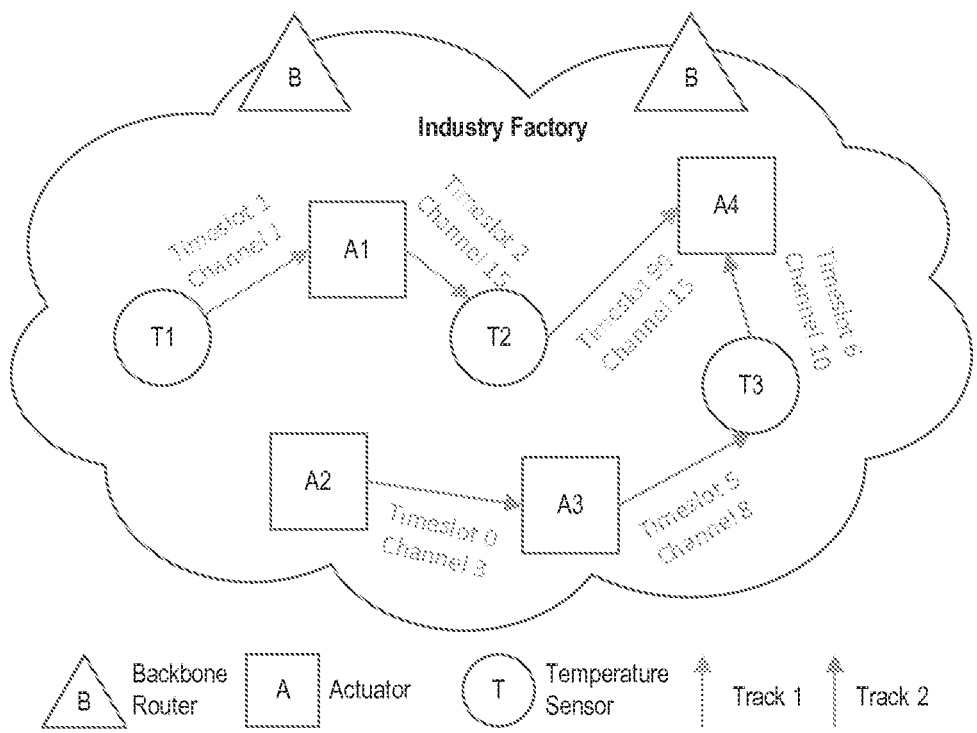
FIG. 3 illustrates an embodiment of an industrial automation and process control in low-power and lossy networks.

As illustrated in FIG. 3, 6TiSCH network for industrial automation and process control is provided with multi-hop communications. In FIG. 3, sensors and actuators are LLN devices. For example, when the Temperature Sensor 1 "T1" in the network senses an event, it will send a signaling packet to Actuator 4 "A4" to trigger several actions. Also, in an automation assembly line, when Actuator 2 "A2" finishes a task, it will send a signaling packet to Actuator 4 "A4" to trigger the next action in the automation assembly line. The throughput and delay of these packets are extremely important for the industrial automation and process control. Thus, a track is reserved between the source and the destination in order to deliver these important signaling packets on time.

General Architecture

Figure 4A:
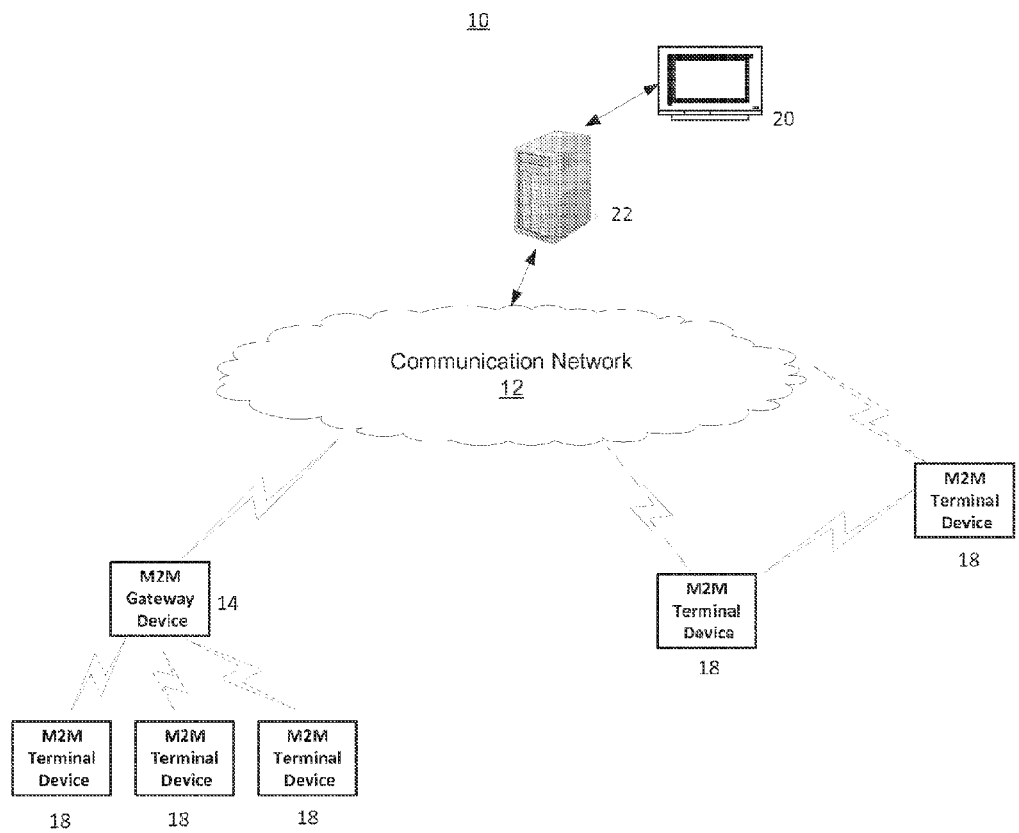
FIG. 4A illustrates an embodiment of a machine-to machine (M2M) or IoT communication system.

FIG. 4A is a diagram of an example machine-to machine (M2M), Internet of Things (IoT), or Web of Things (WoT) communication system 10 in which one or more disclosed embodiments may be implemented. Generally, M2M technologies provide building blocks for the IoT/WoT, and any M2M device, gateway or service platform may be a component of the IoT/WoT as well as an IoT/WoT service layer, etc.

As shown in FIG. 4A, the M2M/IoT/WoT communication system 10 includes a communication network 12. The communication network 12 may be a fixed network, e.g., Ethernet, Fiber, ISDN, PLC, or the like or a wireless network, e.g., WLAN, cellular, or the like, or a network of heterogeneous networks. For example, the communication network 12 may comprise of multiple access networks that provides content such as voice, data, video, messaging, broadcast, or the like to multiple users. For example, the communication network 12 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like. Further, the communication network 12 may comprise other networks such as a core network, the Internet, a sensor network, an industrial control network, a personal area network, a fused personal network, a satellite network, a home network, or an enterprise network for example.

As shown in FIG. 4A, the M2M/IoT/WoT communication system 10 may include the Infrastructure Domain and the Field Domain. The Infrastructure Domain refers to the network side of the end-to-end M2M deployment, and the Field Domain refers to the area networks, usually behind an M2M gateway. The Field Domain includes M2M gateways 14, such as a Backbone router with a proxy, and terminal devices 18, such as LLN devices. It will be appreciated that any number of M2M gateway devices 14 and M2M terminal devices 18 may be included in the M2M/IoT/WoT communication system 10 as desired. Each of the M2M gateway devices 14 and M2M terminal devices 18 are configured to transmit and receive signals via the communication network 12 or direct radio link. The M2M gateway device 14 allows wireless M2M devices, e.g., cellular and non-cellular as well as fixed network M2M devices, e.g., PLC, to communicate either through operator networks, such as the communication network 12 or direct radio link. For example, the M2M devices 18 may collect data and send the data, via the communication network 12 or direct radio link, to an M2M application 20 or M2M devices 18. The M2M devices 18 may also receive data from the M2M application 20 or an M2M device 18. Further, data and signals may be sent to and received from the M2M application 20 via an M2M service layer 22, as described below. In one embodiment, the service layer 22 may be a PCE. M2M devices 18 and gateways 14 may communicate via various networks including, cellular, WLAN, WPAN, e.g., Zigbee, 6LoWPAN, Bluetooth, direct radio link, and wireline for example.

Figure 4B:
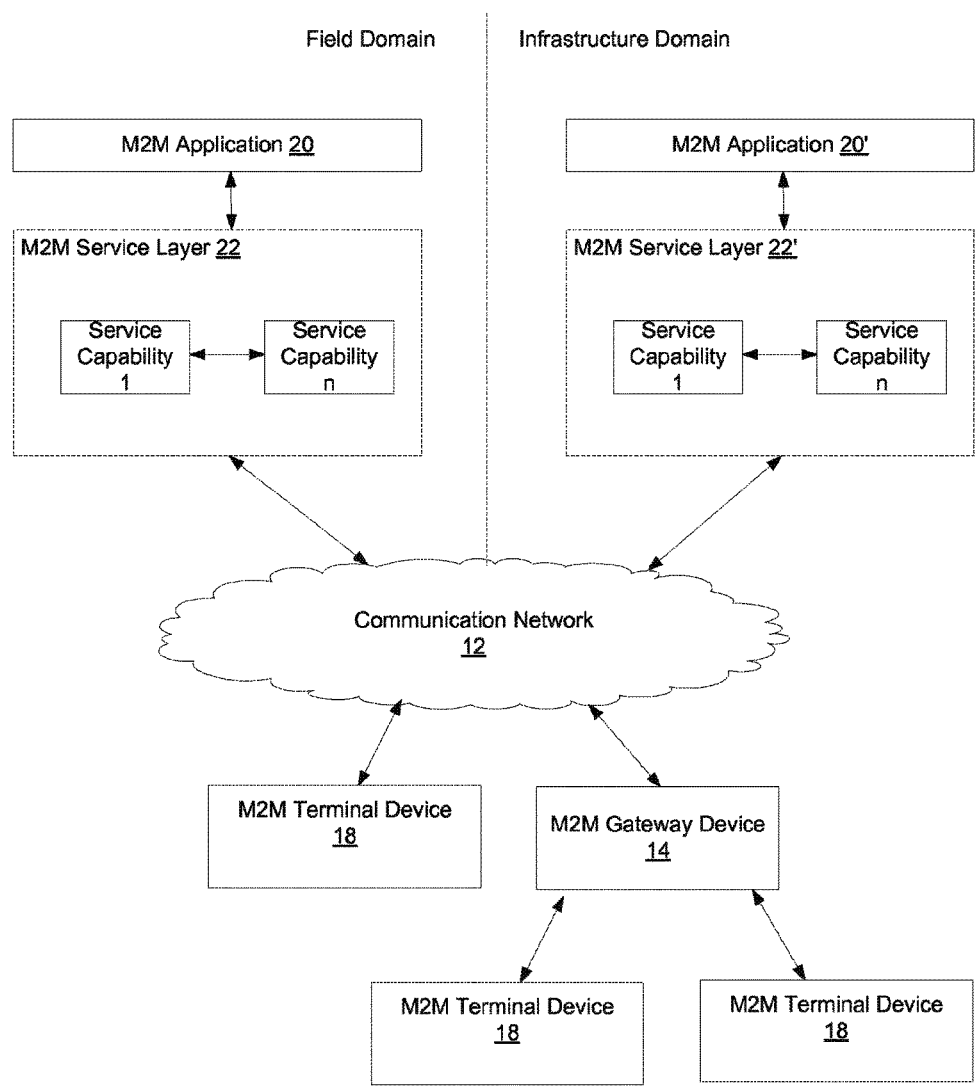
FIG. 4B illustrates an embodiment of the application of a M2M service platform.

Referring to FIG. 4B, the illustrated M2M service layer 22 in the field domain provides services for the M2M application 20, M2M gateway devices 14, and M2M terminal devices 18 and the communication network 12. It will be understood that the M2M service layer 22 may communicate with any number of M2M applications, M2M gateway devices 14, M2M terminal devices 18 and communication networks 12 as desired. The M2M service layer 22 may be implemented by one or more servers, computers, or the like. The M2M service layer 22 provides service capabilities that apply to M2M terminal devices 18, M2M gateway devices 14 and M2M applications 20. The functions of the M2M service layer 22 may be implemented in a variety of ways. For example, the M2M service layer 22 could be implemented in a web server, in the cellular core network, in the cloud, etc.

Similar to the illustrated M2M service layer 22, there is the M2M service layer 22' in the Infrastructure Domain. M2M service layer 22' provides services for the M2M application 20' and the underlying communication network 12' in the infrastructure domain. M2M service layer 22' also provides services for the M2M gateway devices 14 and M2M terminal devices 18 in the field domain. It will be understood that the M2M service layer 22' may communicate with any number of M2M applications, M2M gateway devices and M2M terminal devices. The M2M service layer 22' may interact with a service layer by a different service provider. The M2M service layer 22' may be implemented by one or more servers, computers, virtual machines, e.g., cloud/compute/storage farms, etc., or the like.

Referring also to FIG. 4B, the M2M service layer 22 and 22' provide a core set of service delivery capabilities that diverse applications and verticals can leverage. These service capabilities enable M2M applications 20 and 20' to interact with devices and perform functions such as data collection, data analysis, device management, security, billing, service/device discovery etc. Essentially, these service capabilities free the applications of the burden of implementing these functionalities, thus simplifying application development and reducing cost and time to market. The service layer 22 and 22' also enables M2M applications 20 and 20' to communicate through various networks 12 and 12' in connection with the services that the service layer 22 and 22' provide.

The M2M applications 20 and 20' may include applications in various industries such as, without limitation, transportation, health and wellness, connected home, energy management, asset tracking, and security and surveillance. As mentioned above, the M2M service layer, running across the devices, gateways, and other servers of the system, supports functions such as, for example, data collection, device management, security, billing, location tracking/geofencing, device/service discovery, and legacy systems integration, and provides these functions as services to the M2M applications 20 and 20'. Moreover, the M2M service layer may also be configured to interface with other devices such as LLN devices, backbone routers and PCEs as discussed in this application and illustrated in the figures.

The method of reserving a track as discussed in the present application may be implemented as part of a service layer. The service layer is a software middleware layer that supports value-added service capabilities through a set of Application Programming Interfaces (APIs) and underlying networking interfaces. Both ETSI M2M and oneM2M use a service layer that may contain this method of reserving a track. ETSI M2M's service layer is referred to as the Service Capability Layer (SCL). The SCL may be implemented within an M2M device (where it is referred to as a device SCL (DSCL)), a gateway (where it is referred to as a gateway SCL (GSCL)) and/or a network node (where it is referred to as a network SCL (NSCL)). The oneM2M service layer supports a set of Common Service Functions (CSFs), e.g., service capabilities. An instantiation of a set of one or more particular types of CSFs is referred to as a Common Services Entity (CSE) which can be hosted on different types of network nodes, e.g., infrastructure node, middle node, application-specific node. Further, the method of reserving a track as described in the present application can be implemented as part of an M2M network that uses a Service Oriented Architecture (SOA) and/or a resource-oriented architecture (ROA) to access services such as the reserving a track according to the present application.

Figure 4C:
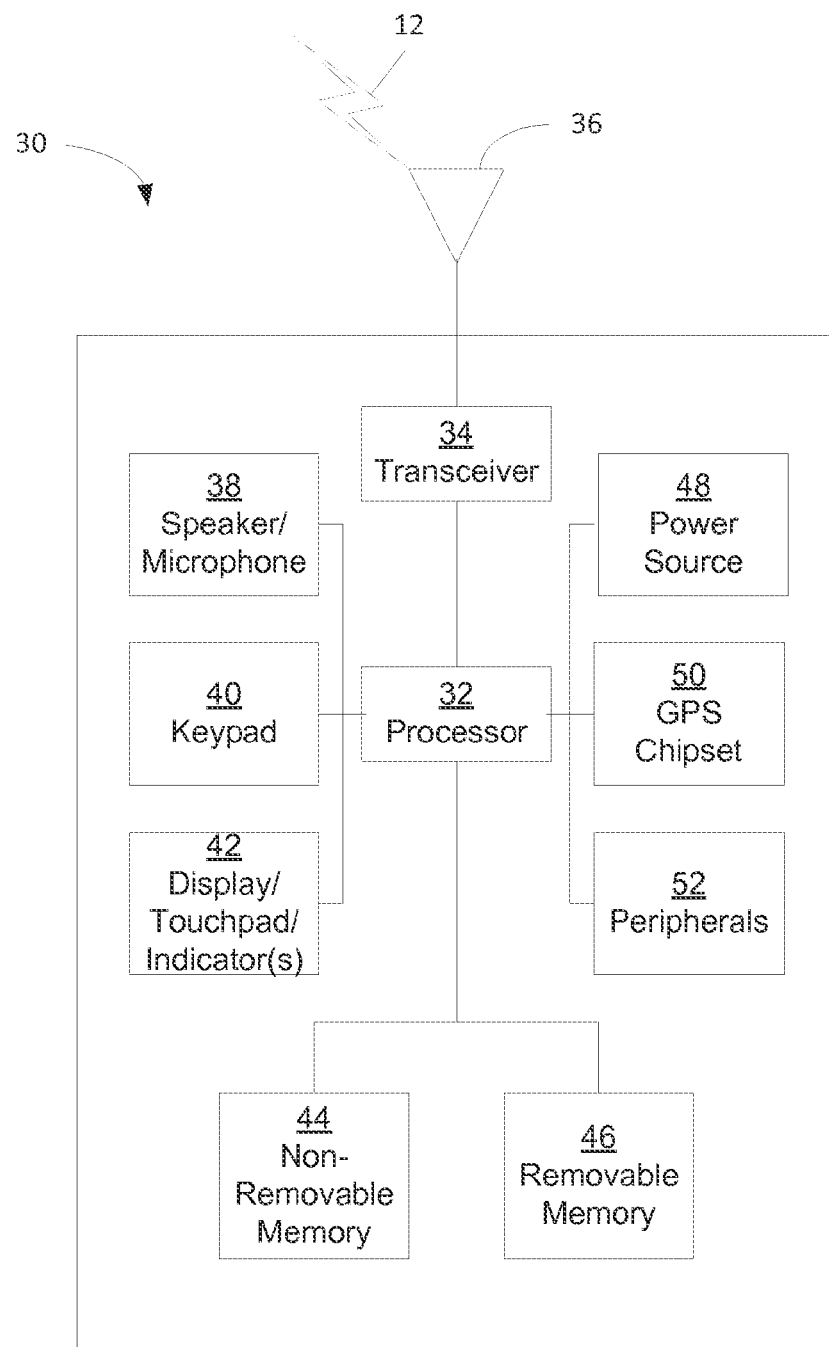
FIG. 4C illustrates an embodiment of the application of a system diagram of an example M2M device.

FIG. 4C is a system diagram of an example M2M device 30, such as a M2M terminal device 18 or an M2M gateway device 14 for example. As shown in FIG. 4C, the M2M device 30 may include a processor 32, a transceiver 34, a transmit/receive element 36, a speaker/microphone 38, a keypad 40, a display/touchpad/indicator(s) 42, non-removable memory 44, removable memory 46, a power source 48, a global positioning system (GPS) chipset 50, and other peripherals 52. It will be appreciated that the M2M device 40 may include any sub-combination of the foregoing elements while remaining consistent with an embodiment. This device may be a device that uses the disclosed systems and methods for embedded semantics naming of sensory data. The M2M device 30 may also be employed with other devices, including fore example LLN devices, backbone routers and PCEs as described in this application and as illustrated in the figures.

The processor 32 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 32 may perform signal coding, data processing, power control, input/output processing, and/or any other functionality that enables the M2M device 30 to operate in a wireless environment. The processor 32 may be coupled to the transceiver 34, which may be coupled to the transmit/receive element 36. While FIG. 4C depicts the processor 32 and the transceiver 34 as separate components, it will be appreciated that the processor 32 and the transceiver 34 may be integrated together in an electronic package or chip. The processor 32 may perform application-layer programs, e.g., browsers, and/or radio access-layer (RAN) programs and/or communications. The processor 32 may perform security operations such as authentication, security key agreement, and/or cryptographic operations, such as at the access-layer and/or application layer for example.

The transmit/receive element 36 may be configured to transmit signals to, or receive signals from, an M2M service platform 22. For example, in an embodiment, the transmit/receive element 36 may be an antenna configured to transmit and/or receive RF signals. The transmit/receive element 36 may support various networks and air interfaces, such as WLAN, WPAN, cellular, and the like. In an embodiment, the transmit/receive element 36 may be an emitter/detector configured to transmit and/or receive IR, UV, or visible light signals, for example. In yet another embodiment, the transmit/receive element 36 may be configured to transmit and receive both RF and light signals. It will be appreciated that the transmit/receive element 36 may be configured to transmit and/or receive any combination of wireless or wired signals.

In addition, although the transmit/receive element 36 is depicted in FIG. 4C as a single element, the M2M device 30 may include any number of transmit/receive elements 36. More specifically, the M2M device 30 may employ MIMO technology. Thus, in an embodiment, the M2M device 30 may include two or more transmit/receive elements 36, e.g., multiple antennas, for transmitting and receiving wireless signals.

The transceiver 34 may be configured to modulate the signals that are to be transmitted by the transmit/receive element 36 and to demodulate the signals that are received by the transmit/receive element 36. As noted above, the M2M device 30 may have multi-mode capabilities. Thus, the transceiver 34 may include multiple transceivers for enabling the M2M device 30 to communicate via multiple RATs, such as UTRA and IEEE 802.11, for example.

The processor 32 may access information from, and store data in, any type of suitable memory, such as the non-removable memory 44 and/or the removable memory 46. The non-removable memory 44 may include random-access memory (RAM), read-only memory (ROM), a hard disk, or any other type of memory storage device. The removable memory 46 may include a subscriber identity module (SIM) card, a memory stick, a secure digital (SD) memory card, and the like. In other embodiments, the processor 32 may access information from, and store data in, memory that is not physically located on the M2M device 30, such as on a server or a home computer.

The processor 32 may receive power from the power source 48, and may be configured to distribute and/or control the power to the other components in the M2M device 30. The power source 48 may be any suitable device for powering the M2M device 30. For example, the power source 48 may include one or more dry cell batteries, e.g., nickel-cadmium (NiCd), nickel-zinc (NiZn), nickel metal hydride (NiMH), lithium-ion (Li-ion), etc.), solar cells, fuel cells, and the like.

The processor 32 may also be coupled to the GPS chipset 50, which is configured to provide location information, e.g., longitude and latitude, regarding the current location of the M2M device 30. It will be appreciated that the M2M device 30 may acquire location information by way of any suitable location-determination method while remaining consistent with an embodiment.

The processor 32 may further be coupled to other peripherals 52, which may include one or more software and/or hardware modules that provide additional features, functionality and/or wired or wireless connectivity. For example, the peripherals 52 may include an accelerometer, an e-compass, a satellite transceiver, a sensor, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 4D:
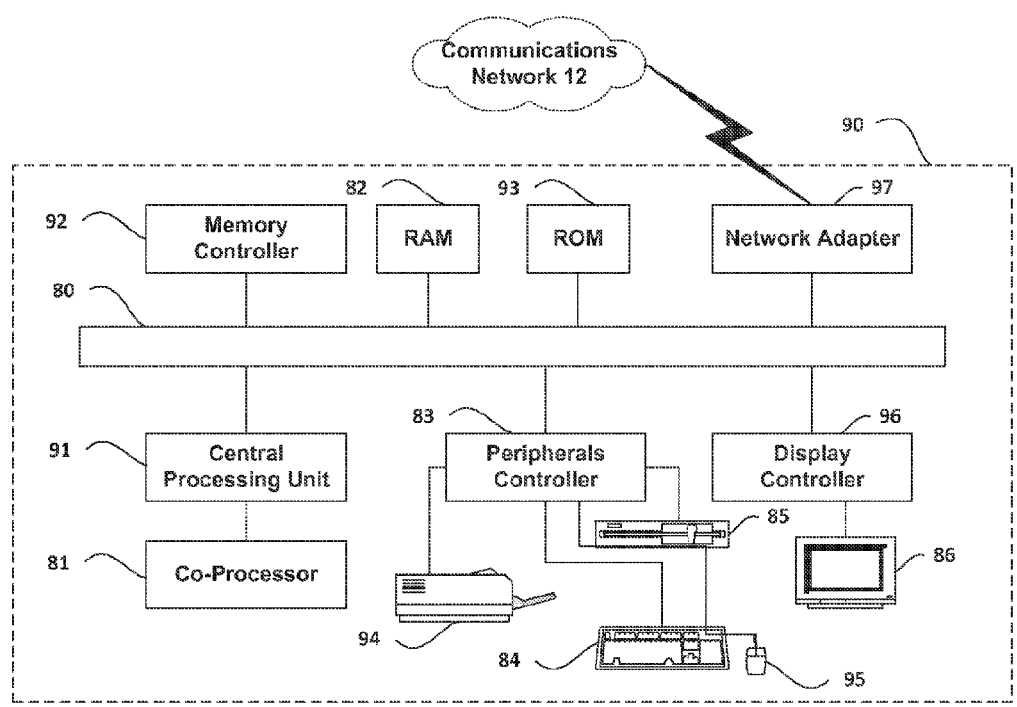
FIG. 4D illustrates an embodiment of the application of a block diagram of an exemplary computing system.

FIG. 4D is a block diagram of an exemplary computing system 90 on which, for example, the M2M service platform 22 of FIG. 4A and FIG. 4B may be implemented. Computing system 90 may comprise a computer or server and may be controlled primarily by computer readable instructions, which may be in the form of software, wherever, or by whatever means such software is stored or accessed. Such computer readable instructions may be executed within central processing unit (CPU) 91 to cause computing system 90 to do work. In many known workstations, servers, and personal computers, central processing unit 91 is implemented by a single-chip CPU called a microprocessor. In other machines, the central processing unit 91 may comprise multiple processors. Coprocessor 81 is an optional processor, distinct from main CPU 91 that performs additional functions or assists CPU 91. CPU 91 and/or coprocessor 81 may receive, generate, and process data related to the disclosed systems and methods for embedded semantic naming, such as queries for sensory data with embedded semantic names.

In operation, CPU 91 fetches, decodes, and executes instructions, and transfers information to and from other resources via the computer's main data-transfer path, system bus 80. Such a system bus connects the components in computing system 90 and defines the medium for data exchange. System bus 80 typically includes data lines for sending data, address lines for sending addresses, and control lines for sending interrupts and for operating the system bus. An example of such a system bus 80 is the PCI (Peripheral Component Interconnect) bus.

Memory devices coupled to system bus 80 include random access memory (RAM) 82 and read only memory (ROM) 93. Such memories include circuitry that allows information to be stored and retrieved. ROMs 93 generally contain stored data that cannot easily be modified. Data stored in RAM 82 can be read or changed by CPU 91 or other hardware devices. Access to RAM 82 and/or ROM 93 may be controlled by memory controller 92. Memory controller 92 may provide an address translation function that translates virtual addresses into physical addresses as instructions are executed. Memory controller 92 may also provide a memory protection function that isolates processes within the system and isolates system processes from user processes. Thus, a program running in a first mode can access only memory mapped by its own process virtual address space; it cannot access memory within another process's virtual address space unless memory sharing between the processes has been set up.

In addition, computing system 90 may contain peripherals controller 83 responsible for communicating instructions from CPU 91 to peripherals, such as printer 94, keyboard 84, mouse 95, and disk drive 85.

Display 86, which is controlled by display controller 96, is used to display visual output generated by computing system 90. Such visual output may include text, graphics, animated graphics, and video. Display 86 may be implemented with a CRT-based video display, an LCD-based flat-panel display, gas plasma-based flat-panel display, or a touch-panel. Display controller 96 includes electronic components required to generate a video signal that is sent to display 86. Display 86, may display sensory data in files or folders using embedded semantics names. Further, computing system 90 may contain network adaptor 97 that may be used to connect computing system 90 to an external communications network, such as network 12 of FIG. 4A and FIG. 4B.

Figure 5:
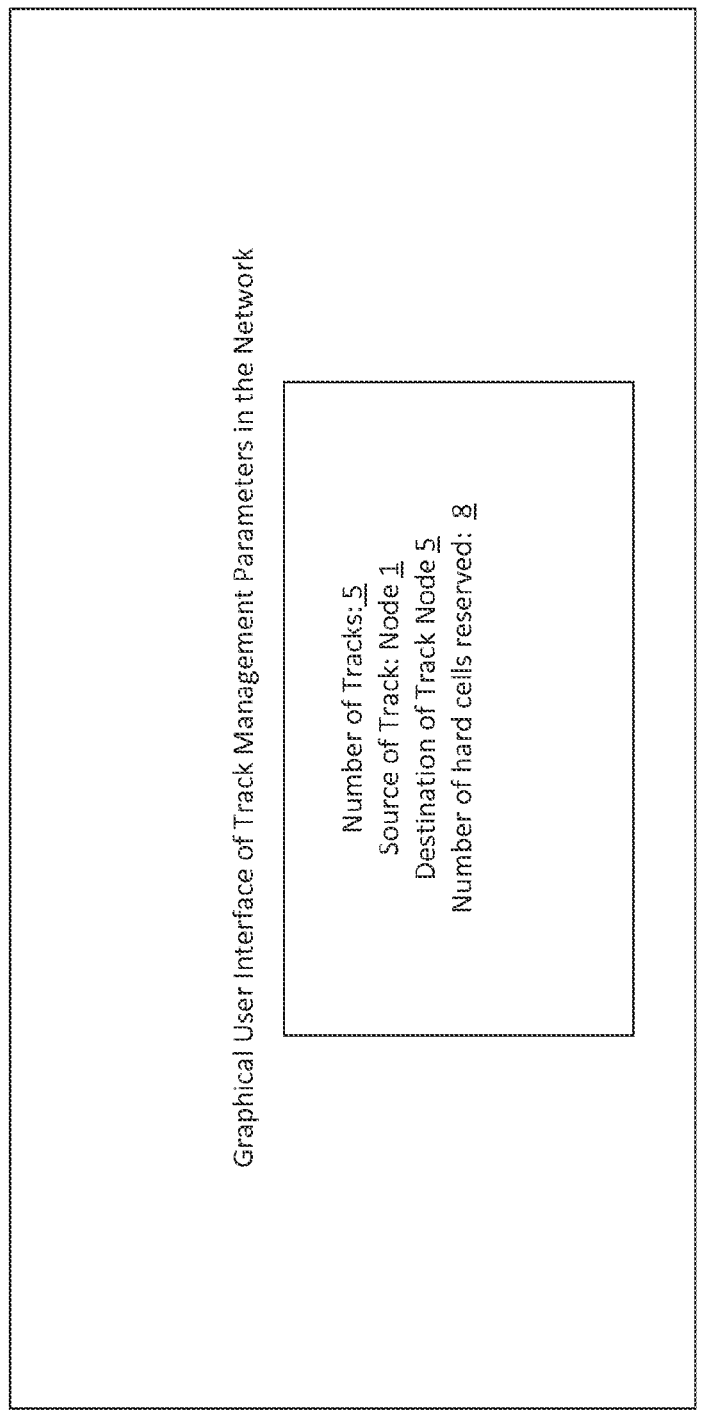
FIG. 5 illustrates a graphical user interface of track management parameters in the network according to an embodiment.

According to an embodiment, the display 86 includes a graphical user interface (GUI) for a central controller as shown in FIG. 5. The GUI displays track management parameters in the network. For example, the GUI in FIG. 5 displays features including but not limited to: "Number of tracks," "Source of a track," "Destination of a track," and "Number of Hard Cells Reserved." As shown in FIG. 5, there are 5 total tracks. Node 1 is the source. Node 5 is the destination. Further, there are 8 hard cells reserved. Separately, users may control the GUI via a touchpad on the display or via a keyboard configured to communicate with the GUI.

According to the present application, it is understood that any or all of the systems, methods and processes described herein may be embodied in the form of computer executable instructions, e.g., program code, stored on a computer-readable storage medium which instructions, when executed by a machine, such as a computer, server, M2M terminal device, M2M gateway device, or the like, perform and/or implement the systems, methods and processes described herein. Specifically, any of the steps, operations or functions described above may be implemented in the form of such computer executable instructions. Computer readable storage media include volatile and nonvolatile, removable and non-removable media implemented in any method or technology for storage of information, but such computer readable storage media do not includes signals. Computer readable storage media include, but are not limited to, RAM, ROM, EEPROM, flash memory or other memory technology, CD ROM, digital versatile disks (DVD) or other optical disk storage, magnetic cassettes, magnetic tape, magnetic disk storage or other magnetic storage devices, or any other physical medium which can be used to store the desired information and which can be accessed by a computer.

ICMPv6 Protocol

Internet Control Message Protocol version 6 (ICMPv6) is used by hosts and routers to communicate network layer information to each other. ICMP is often considered as part of the IP. ICMP messages are carried inside IP datagrams. Each ICMP message contains three fields that define its purpose and provide a checksum. They are Type, Code, and Checksum fields. The Type field identifies the ICMP message, the Code field provides further information about the associated Type field, and the Checksum provides a method for determining the integrity of the message. According Internet Assigned Numbers Authority (IRNA), the type numbers of 159-199 are unassigned.

IPv6 Routing Protocol for Low-Power and Lossy Networks

According to an embodiment, IETF 6TiSCH Working Group IPv6 Routing Protocol for Low-Power and Lossy Networks (RPL) is the default routing protocol in 6TiSCH network. RPL is a gradient routing protocol that organizes routers along a Destination Oriented Directed Acyclic Graph (DODAG) root at the BR. For example, three DODAGs are rooted at BRs.

In particular, the RPL Control Message includes an ICMPv6 header followed by a message body. The message body is comprised of a message base and a number of options. The RPL control message is an ICMPv6 information message with a Type of 155. The Code field identifies the type of RPL control message, e.g., the broadcasting DODAG Information Object (DIO) message and a Destination Advertisement Object (DAO) message discussed in more detail below. The base field contains the basic information of control message such as flags and sequence number. The Options contain contents to be delivered.

The DODAG root BR initiates the DODAG formation by periodically broadcasting DODAG Information Object (DIO) messages. DIO messages carry information such as the DODAG root's identity, the routing metrics in use, as well as the originating router's depth, e.g., rank, in the DODAG. A LLN device joins the DODAG by choosing the neighbor that has the smallest rank as its parent. After joining the DODAG, a LLN device determines its own rank in the DODAG based on the information advertised by its parent DIO. Once a LLN device has joined the DODAG, it has a path to the root through its parent(s), and can then originate its own DIO messages and broadcast it to other LLN devices.

RPLs provide a path from a LLN device to its root while requiring routers only to store information about its parent in the DODAG. A path is also required for traffic to flow in the downward direction, i.e., traffic originates from outside the LLN network, at the root or at any intermediate nodes and destined to a LLN device. To build a downward path, each LLN device broadcasts a Destination Advertisement Object (DAO) message. A DAO messages usually contains a set of one or more RPL Target options and Transit Information options. These may include, for example, a target IPv6 address, prefix or multicast group. The Field and descriptions are provided in Table 3 below.

TABLE 3

| Fields Name | Description |
| --- | --- |
| Option Type | Always set to 0x05. |
| Option Length | Variable, length of the option in octets excluding the Type and Length fields. |
| Flags | 8-bit unused field reserved for flags. The field MUST be initialized to zero by the sender and MUST be ignored by the receiver. |
| Prefix Length | 8-bit unsigned integer. Number of valid leading bits in the IPv6 Prefix. |
| Target Prefix | Variable-length field identifying an IPv6 destination address, prefix, or multicast group. |

In addition, the Transit Information option is provided in Table 4 below and is used for a node to indicate attributes for a path to one or more destinations. The destinations are indicated by one or more Target options that immediately precede the Transit Information option. The fields in the options are captured in Table 3.

TABLE 4

| Fields Name | Description |
| --- | --- |
| Option Type | Always set to 0x06 |
| Option Length | Variable, depending on whether or not the DODAG Parent Address subfield is present. |
| External (E) | 1-bit flag. The 'E' flag is set to indicate that the parent router redistributes external targets into the RPL network. |
| Flags | The 7 bits remaining unused in the Flags field are reserved for flags. |
| Path Control | 8-bit bit field. The Path Control field limits the number of DAO parents to which a DAO message advertising connectivity to a specific destination may be sent, as well as providing some indication of relative preference. |
| Path Sequence | 8-bit unsigned integer. When a RPL Target option is issued by the node that owns the Target prefix (i.e., in a DAO message), that node sets the Path Sequence and increments the Path Sequence each time it issues a RPL Target option with updated information. |
| Path Lifetime | 8-bit unsigned integer. The length of time in Lifetime Units (obtained from the Configuration option) that the prefix is valid for route determination. |
| Parent Address (optional) | IPv6 address of the DODAG parent of the node originally issuing the Transit Information option. This field may not be present, as according to the DODAG Mode of Operation (Storing or Non-Storing) and indicated by the Transit Information option length. |

Figure 6A:
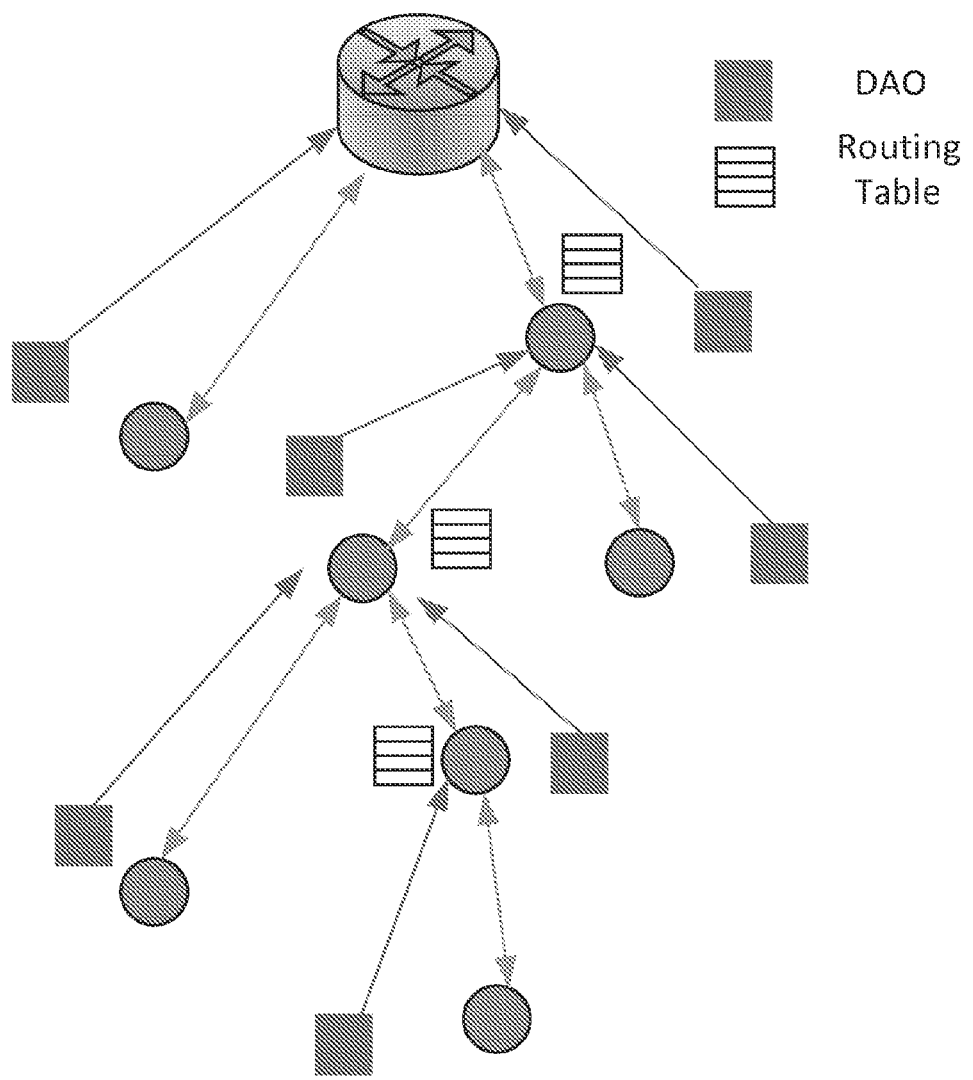
FIG. 6A illustrates a routing protocol for low-power and lossy networks according to an embodiment of the application.

According to another embodiment of the application, two routing modes are supported in RPL. These include a storing mode and a non-storing mode. In the storing mode, each LLN device in the network unicasts DAO messages to all parent LLN devices which maintain additional downward routing tables as illustrated in FIG. 6A. In the DAO message, the parent address field in the Transit Information option is empty since LLN devices only announce prefixes that are reachable through it. The LLN devices use the multiple Target option in order to advertise multiple prefixes. LLN devices that received a packet from the BR to an LLN device will look up their routing table and forward the packet. The storing mode requires each LLN device in the network to have memory to store a routing table. However, some LLN devices in the network may have significant constraints regarding memory and may be incapable of storing routing entries for downward routes. Therefore, the non-storing mode may be used.

Figure 6B:
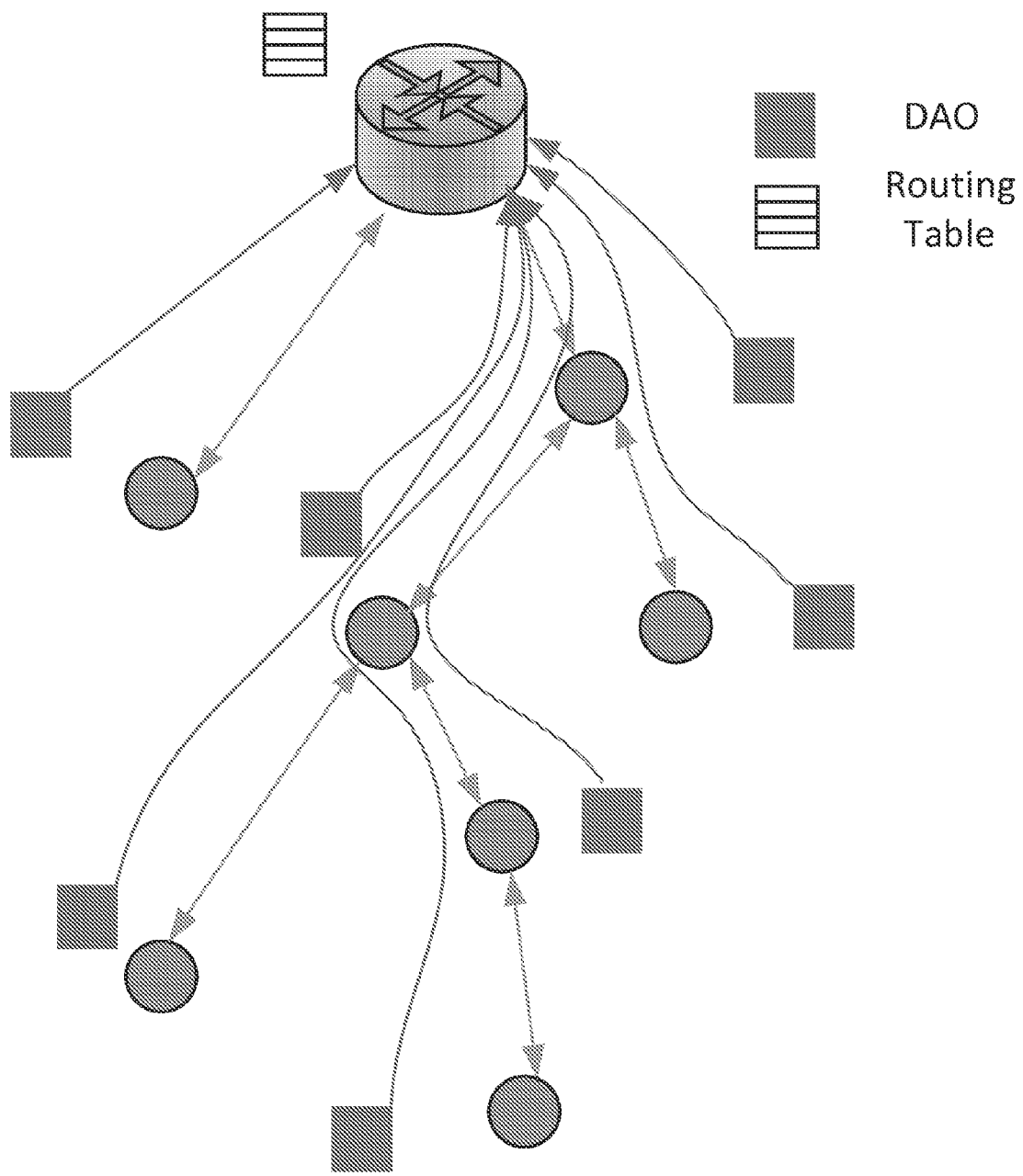
FIG. 6B illustrates a routing protocol for low-power and lossy networks according to another embodiment of the application.

Conversely, in a non-storing mode, a LLN device reports its DAO message through its parent all the way to the BR as illustrated in FIG. 6B. In the DAO message, the LLN devices put their parents' IPv6 address in multiple Transit Information options. The BR stores the information received to piece together a downward route to an LLN device by using DAO parent sets from each LLN device in the route. When the BR receives a packet destined to an LLN device, the BR adds the information in the source routing header of the packet and forwards it to the next-hop child LLN device in the network. Each intermediate LLN device examines the information in the source routing header and forwards the packet to the next-hop child LLN device. This forwarding process is repeated until the packet reaches the final destination.

Figure 7:
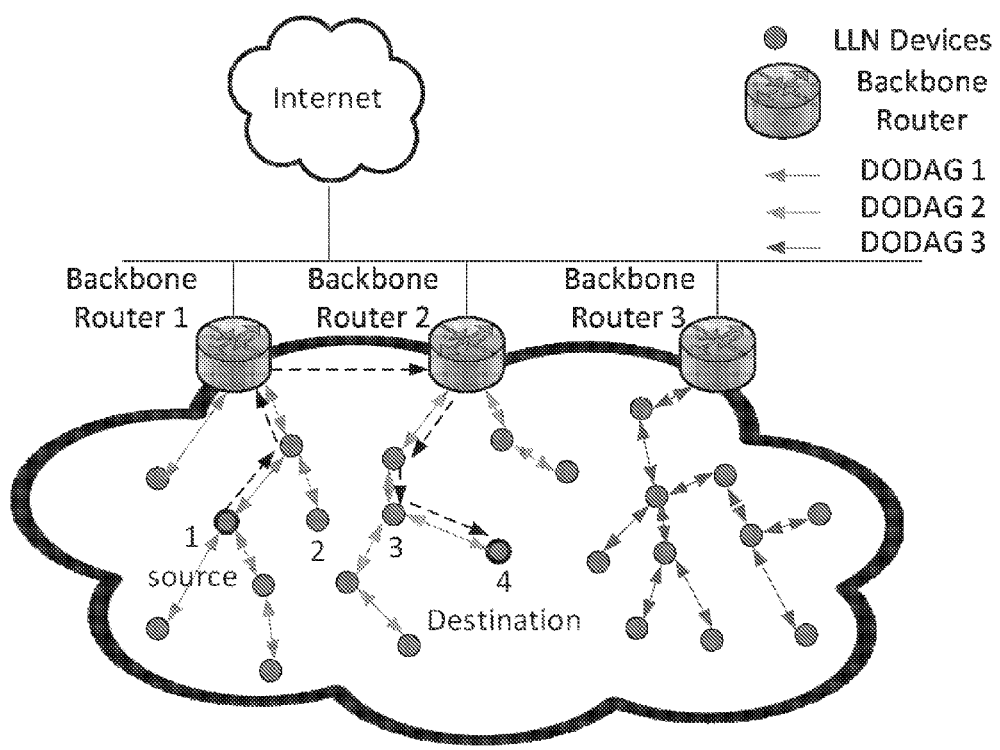
FIG. 7 illustrates a path for a routing protocol for low-power and lossy networks in a 6TiSCH network according to an embodiment of the application.

Further, a track from the source LLN device to the destination LLN device along the DODAG may be employed. For example, the track marked with the dashed line in FIG. 7 begins from the source LLN device 1 and goes all the way up the BR1 along the DODAG rooted at BR1. It comes down to the destination LLN device 4 along the DODAG rooted at BR2. Tracks using a RPL route usually have longer delay since the route has to go through BRs. This especially occurs when the source LLN device and the destination LLN device are not far away from each other. Tracks using RPL path also bring extra overhead at BRs since all the paths have to go through BRs.

Reactive Discovery of Point-to-Point Routes in Low-Power and Lossy Networks

Figure 8:
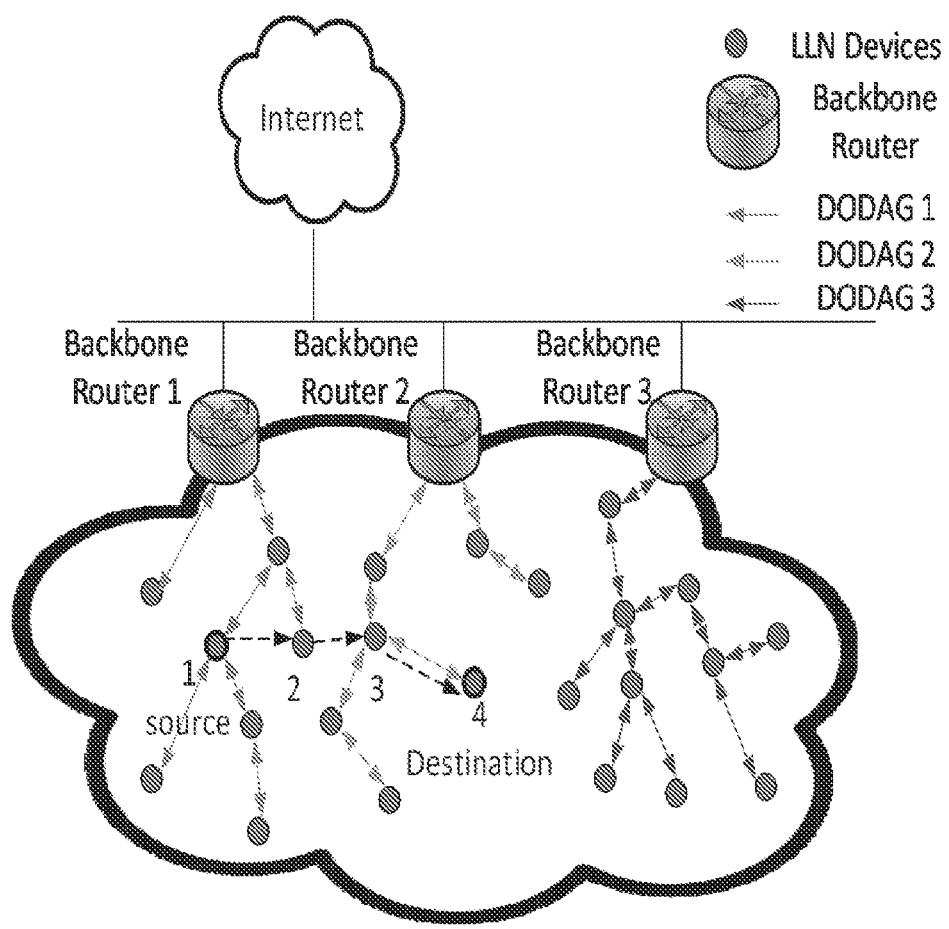
FIG. 8 illustrates a point-to-point path for a routing protocol for low-power and lossy networks in a 6TiSCH network according to an embodiment of the application.

According to yet another embodiment, Reactive Discovery of Point-to-Point Routes in Low-Power and Lossy Networks, e.g., P2P-RPL, describes a reactive scheme that can provide well performed paths on-demand from the source to the destination without having to go through the BR. Using P2P-RPL, when a source LLN device needs to discover a path to a destination LLN device, the source originates a Route-Request message indicating it seeks a path to the destination. This message is piggy-backed on DIO messages and disseminated throughout the network. This creates a temporary DODAG rooted at the source. Upon receiving such a message, the destination sends a P2P Discovery Reply Object Acknowledgement message back to the source, thus establishing a path between the source and destination as illustrated, for example, in FIG. 8.

Hybrid Track Reservation

According to another embodiment, a proactive technique employs the power of a BR. This technique brings less overhead to the LLN devices in the network while enabling BRs to obtain topology information for the network. The reason to choose the BR to store the topology information of the network is because the BR is usually more powerful than LLN devices and has pre-built RPL paths to all LLN devices in the network. The source LLN device can inquire with its BR to obtain a well performed, e.g., the shortest, path to the destination. Subsequently, the source LLN device may use different reactive procedures discussed in more detail in this application to reserve resources along the path. The described procedures are better able to operate with the dynamically changing schedule of a LLN device due to traffic and channel conditions.

Figure 9:
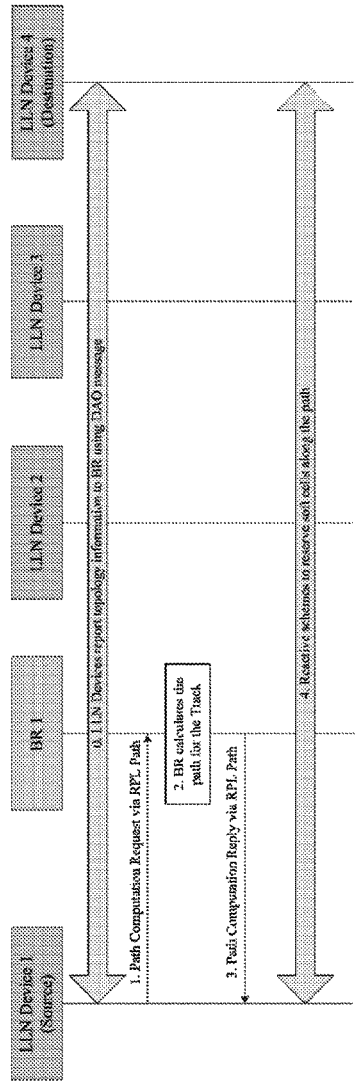
FIG. 9 illustrates a point-to-point Track reservation protocol according to an embodiment of the application.

In an exemplary embodiment, the procedure of P2P track reservation scheme is illustrated in the call flow shown in FIG. 9. Each of the steps is denoted by a numeral. According to Step 0, the LLN devices in the network report their topology information, e.g., neighbor information, to BRs. Next, the Source LLN device sends a "Path Computation Request" to the BR (Step 1). The Path Computation Request may include but is not limited to the fields provided in Table 5 below.

TABLE 5

| Field Name | Description |
| --- | --- |
| Source Address | The IP/MAC address of the source LLN device that sends the request. |
| Destination Address | The IP/MAC address of the destination LLN device on the track. |
| Address of the all LLN devices that does not have enough resource (optional) | The IP/MAC address of the all LLN devices that should be bypassed due to insufficient resource. The source can obtain this information from the Track Assignment Reply message received. |

In Step 2, the BR calculates the path for the track according to the topology information and the information in the track Computation Request. The BR will avoid choosing LLN devices that do not have enough resource listed in the Path Computation Request. Next, the BR sends a "Path Computation Reply message" to source LLN device (Step 3). In the message, BR indicates a success if it finds a path that satisfies the requirement in the Path Computation Request message. Otherwise, the BR indicates a failure. The "Path Computation Reply message" may include but is not limited to the fields provided in Table 6 below.

TABLE 6

| Field Name | Description |
| --- | --- |
| Source Address | The IP/MAC address of the source LLN device on the track. |
| Destination Address | The IP/MAC address of the destination LLN device on the track. |

TABLE 6-continued

| Field Name | Description |
| --- | --- |
| Address of the 1$^{st}$ LLN device on the Track | The IP address of the LLN device that is selected as 1$^{st}$ hop on the track. |
| Address of the subsequent LLN devices on the Track | The IP address of the LLN devices that are selected as subsequent hops on the track. |

In Step 4, the Soft Cell reservation procedure is initiated by the source LLN device to reserve resources on the track. These may be reactive schemes to reserve Soft Cells along the track. If the Soft Cell reservation process fails, e.g., a LLN device on the path does not have enough resources, the source LLN device will send a "new Path Computation Request message" which contains the address of LLN devices that do not have enough resources. By so doing, the BR may avoid choosing those LLN devices when it calculates another path.

Proactive Procedure for Reporting Topology Information

According to an aspect of the application, a proactive procedure is described for reporting topology information from the LLN device to the BR. In RPL schemes, all LLN devices periodically send DAO messages upward along the DODAG. However, in these messages, LLN devices only report its parents' set (in non-storing mode), or alternatively, sub-DAG information (in storing mode). It will not report neighbor information. LLN devices may generate a new type of message to report its neighbor information. While this may bring extra overhead to LLN devices in the network to generate and forward these messages, a low-cost procedure for collecting topology information is provided by adding neighbor information in existing RPL DAO messages without requiring extra messages.

Figure 10:
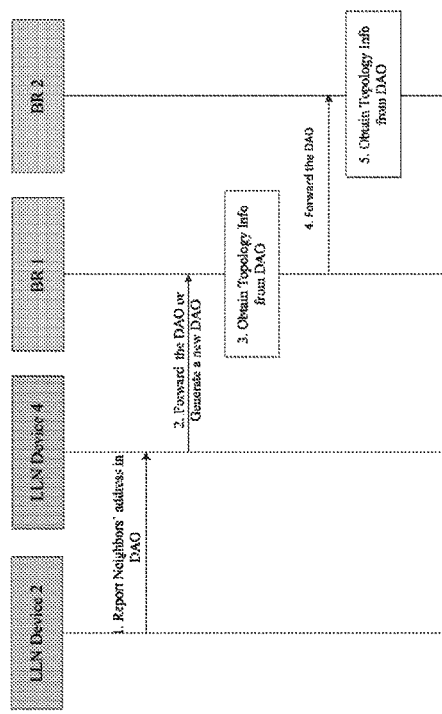
FIG. 10 illustrates a protocol for collecting topology information for low-power and lossy devices according to an embodiment of the application.

An exemplary embodiment of the call flow is illustrated in FIG. 10. In Step 1, each LLN device listens to the DIO messages sent by other LLN devices in the network. After receiving a DIO message, a LLN device will update its neighbor list. For example, if the LLN device receives a DIO from a LLN device that is not in its neighbor list, it will create a new entry in the neighbor list. Alternatively, if the LLN device receives a DIO from a LLN device that is already in the neighbor list, it will update the lifetime of the neighbor. Each LLN device in the network inserts its neighbor information into the DAO message as shown in Table 7 below.

TABLE 7

| Field Name | Description |
| --- | --- |
| Reporting Address | The IP/MAC address of the LLN device that sends the message. |
| Address of all Neighbors | The IP/MAC address of all neighbors. |

In Step 2, after receiving a DAO message, a parent LLN device, e.g., LLN device 4 in FIG. 10, will forward the DAO message to its parent. LLN device 4 may also combine neighbor information from a plurality of DAO messages it has received into a new DAO message. In turn, it may send the new DAO message to its parent. Next, the BR receives the message and obtains topology information from the DAO message (Step 3). In Step 4, the BR will forward the DAO messages it received to other BRs in the network. Furthermore, each BR will know the topology information of the whole network (Step 5).

Hop by Hop P2P Track Assignment

Figure 11:
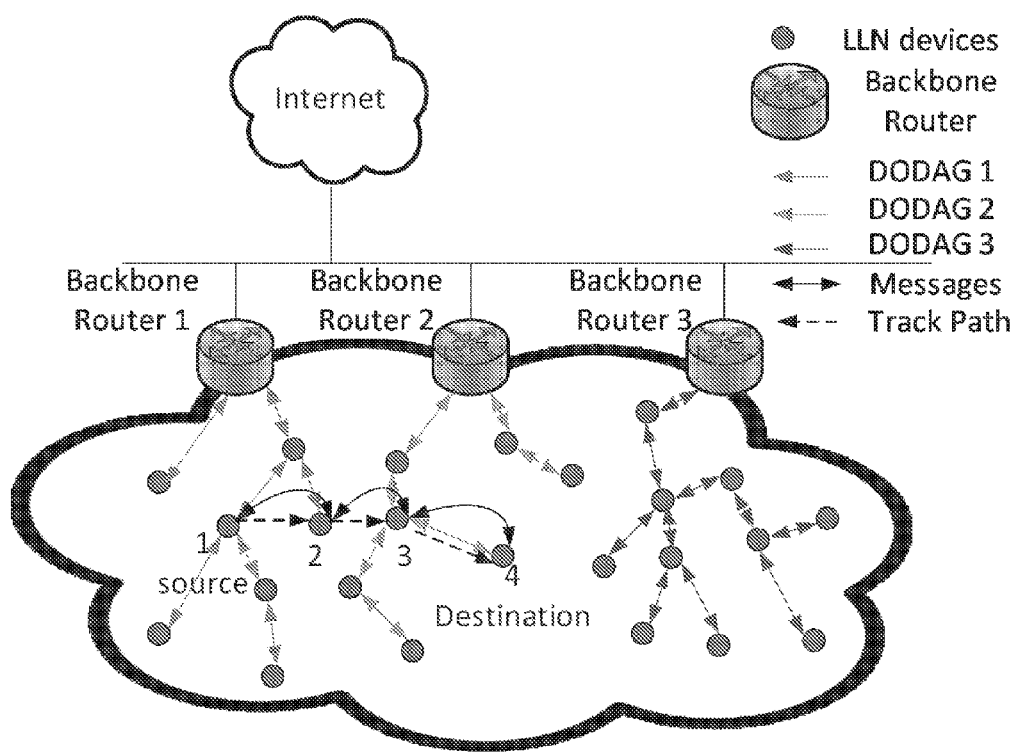
FIG. 11 illustrates a hop by hop track assignment technique according to an embodiment of the application.

As mentioned above in this application, after the BR calculates the path from the source LLN device to the destination LLN device, Soft Cells may be reserved for LLN devices on the path. According to one embodiment, in hop-by-hop track assignment procedures, each LLN device on the track negotiates with its previous-hop LLN device and next-hop LLN device to set up Soft cells as illustrated, for example, in FIG. 11. Here, LLN devices 2, 3 and 4 negotiate for a track assignment.

According to an exemplary embodiment, each LLN device on the track negotiates with its previous and next hop LLN device to assign Soft Cells. All negotiation messages are transmitted in the shared broadcasting slots in a Slot-frame, e.g., Slot 0, as illustrated in Table 5. The Soft Cells of each hop are sequentially reserved along the path. For example, the Soft Cells between LLN device 2 and LLN device 3 are reserved after Soft Cells between LLN device 1 and 2 have been reserved.

Figure 12:
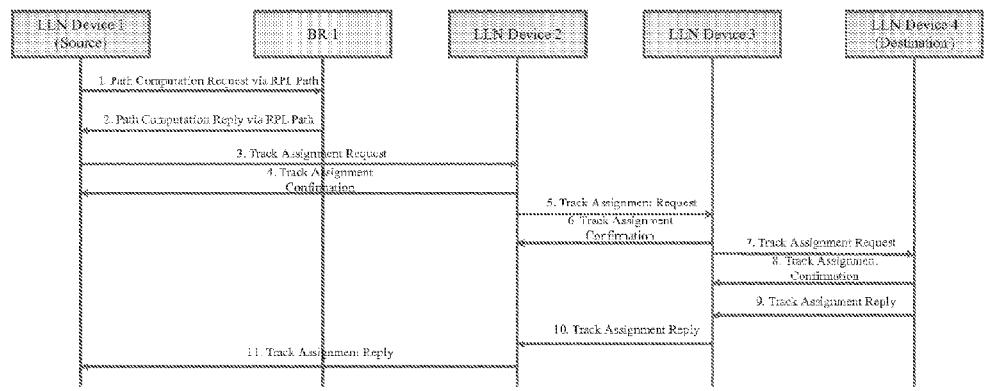
FIG. 12 illustrates a call flow for a hop by hop track assignment protocol according to another embodiment of the application.

The basic hop by hop track assignment procedure is shown in the exemplary embodiment in FIG. 12. In FIG. 12, each step is denoted by a numeral. According to Step 1, the Source LLN device sends a "Path Computation Request" to the BR. "The Path Computation Request" may include but is not limited to the fields in Table 5 above. Next, in Step 2, the BR calculates the path for the track based on topology information and information in the Path Computation Request. The BR sends a "Path Computation Reply Message" to the source LLN device. The "Path Computation Reply message" may include but is not limited to the fields listed in Table 6.

Thereafter, the source LLN device sends a "Track Assignment Request message" to LLN device 2 (Step 3). The "Track Assignment Request message" may include but is not limited to the fields provided in Table 8 below. For example, in the message, LLN device 1 will notify LLN device 2 that the remaining LLN devices on track are LLN device 3 and 4. Moreover, LLN device 1 also includes its unscheduled slots that may be reserved for LLN device 2 in the message. LLN device 2 will check its unscheduled slots which overlap with unscheduled slots of LLN device 1 (Step 4). LLN device 2 makes a decision whether to accept the track assignment based on its resources. For example, if LLN device 2 has fewer unscheduled slots which overlap with LLN device 1 than the requested slots, LLN device 2 will indicate a failure in a "Track Assignment Confirmation message" subsequently sent to LLN device 1. Otherwise, LLN device 2 determines the cells reserved for the communication and sends the information of these cells to LLN device 1 via the "Track Assignment Confirmation message." The "Track Assignment Confirmation message" may include but is not limited to the fields listed in Table 9 below.

TABLE 8

| Field Name | Description |
| --- | --- |
| Transmitter Address | The IP/MAC address of the LLN device that sends Track Assignment Request. |
| Receiver Address | The IP/MAC address of the LLN devices on the track that receives Track Assignment Request. |
| Source Address | The IP/MAC address of the source LLN device on the track. |
| Track ID | The ID of the Track generated by the source. |
| Lifetime | The lifetime or duration of the Track. LLN devices can release the resource reserved for a Track when the Track expires. |

TABLE 8-continued

| Field Name | Description |
| --- | --- |
| Address of LLN devices on the rest of the Track | The IP/MAC address of LLN devices on the rest of the track. |
| Requested slots | The minimum number of slots requested for each hop of communication on the track. |
| All unscheduled slots info | The Slot Offset of all unscheduled slots of the transmitter that can be reserved for the receiver. |

TABLE 9

| Field Name | Description |
| --- | --- |
| Transmitter Address | The IP/MAC address of the source LLN device that sends Track Assignment Confirmation. |
| Receiver Address | The IP/MAC address of the LLN devices on the track that receives Track Assignment Confirmation. |
| Source Address | The IP/MAC address of the source LLN device on the track. |
| Track ID | The ID of the Track. |
| Decision | The decision of the track assignment. The value is true if the transmitter has unscheduled slots that meet the request and is false otherwise. |
| All confirmed cells info (optional) | The Slot Offset and Channel Offset of the all cells reserved for communication between the transmitter and the receiver. These fields are valid only if the Decision field is true. |

Similar to LLN device 1 in Step 3 recited above, LLN device 2 sends a "Track Assignment Request" to its next hop on the track, e.g., LLN device 3 (Step 5). Thereafter, in Step 6, and similar to LLN device 2 in Step 4 recited above, LLN device 3 checks its unscheduled slots that have the same slot offset with LLN device 2. LLN device 3 determines whether it accepts the track assignment based on its resources. If LLN device 3 has fewer unscheduled slots overlapping with LLN device 2 than the requested slots, LLN device 2 will indicate a failure in a "Track Assignment Confirmation message" it subsequently sends on to LLN device 2. Thereafter, LLN device 2 will send a "Track Assignment Reply Message" to LLN device 1 to indicate LLN device 3 does not have enough resources for the track reservation. Both LLN devices 1 and 2 will release the reserved resource for the track. Otherwise, LLN device 3 decides the cells reserved for the communication and sends the information of these cells to LLN device 2 via the track Assignment Confirmation message and proceeds to the next step. The track Assignment Confirmation message may include but is not limited to the fields listed in Table 9.

According to Step 7, and similar as LLN device 1 in Step 3, the LLN device 3 sends a "Track Assignment Request message" to its next hop on the track, i.e., LLN device 4. The "Track Assignment Request message" may include but is not limited to the fields listed in Table 8. Next, similar to LLN device 2 in Step 4, the LLN device 4 will check its unscheduled cells that have the same slot offset with LLN device 3 (Step 8). LLN device 4 makes a decision to accept the track assignment based on its resources. Namely, if LLN device 4 has fewer unscheduled slots overlapping with LLN device 3 than the requested slots, LLN device 4 will indicate a failure in a track assignment confirmation message. It will then send the message to LLN device 3. LLN device 3 will send a "Track Assignment Reply Message" to LLN device 2 to indicate LLN device 4 does not have enough resources. The "Track Assignment Reply message" will be forwarded back to LLN device 1. LLN devices 1, 2 and 3 will release the reserved resources for the track.

On the other hand, if LLN device 4 decides the cells should be reserved for the communication. LLN device 4 sends the information of these cells to LLN device 3 via the "Track Assignment Confirmation message" and proceeds to the next step. The "Track Assignment Confirmation message" may include but is not limited to the fields listed in Table 10 below.

TABLE 10

| Field Name | Description |
| --- | --- |
| Transmitter Address | The IP/MAC address of the LLN device that sends the Track Assignment Confirmation. |
| Receiver Address | The IP/MAC address of the LLN devices on the Track that receives the Track Assignment Confirmation. |
| Source Address | The IP/MAC address of the source LLN device on the track. |
| Track ID | The ID of the track. |
| Decision | The decision of the Track assignment. The value is true if the track is reserved successfully and is false otherwise. |
| Addresses of failure LLN devices (optional) | The IP/MAC address of the LLN devices that does not have enough resource. These fields are valid only when the Decision field is false. |

According to Step 9, the destination LLN device, e.g., LLN device 4, sends a "Track Assignment Reply message" to LLN device 3. The "Track Assignment Reply message" may include but is not limited to the fields listed in Table 10. Subsequently, LLN device 3 forwards the "Track Assignment Reply Message" to LLN device 2 (Step 10). Further, the LLN device 2 forwards the "Track Assignment Reply Message" to LLN device 1 (Step 11).

Enhanced Hop by Hop Track Assignment

According to another aspect of the application, an improved track assignment procedure is described to overcome inefficiencies in track reservation failure including for example, large delays for response failures and high overhead for reserving unused resources. In terms of delays, for instance, if there are not enough resources between LLN devices 3 and 4, the failure response will not be sent until the Soft Cells reservation is accomplished by LLN devices 1, 2 and 3. In terms of high overhead, for instance, when LLN devices 1 and 2 are reserving resources for the Track, they are not aware if there are enough resources between LLN devices 3 and 4. Accordingly, these negotiation messages become overhead when the track reservation between LLN devices 3 and 4 fails. Further, LLN devices 1 and 2 have to release these resources after receiving the failure response.

According to another embodiment of the application, the improved track assignment procedure also improves the probability to successfully reserve a track along a path. In particular, LLN devices on the path are generally not aware of the TSCH schedule of other LLN devices on the path. This may be the case when LLN devices 1 and 2 both have slots 1 and slot 2 available, and LLN device 3 only has slot 1 available. LLN devices 1 and 2 may choose to reserve slot 1 for their communication without knowing the TSCH schedule information of LLN device 3. This will result in a failure to reserve the track along LLN devices 1, 2 and 3. In addition, the enhanced Track Assignment Request contains extra information, e.g., unscheduled slot information of the LLN device on the previous hop, to increase the probability of successfully reserving a Track along a path.

According to another embodiment, the enhanced "Track Assignment Request Message" is forwarded to the destination before reserving any Soft Cells. Accordingly, if a LLN device in the middle of the track determines it does not have enough resources when receiving the message, it can send a response to the source LLN device and immediately inform it of the failure. This helps to reduce delays in the overall process. This also helps improve throughput.

Figure 13:
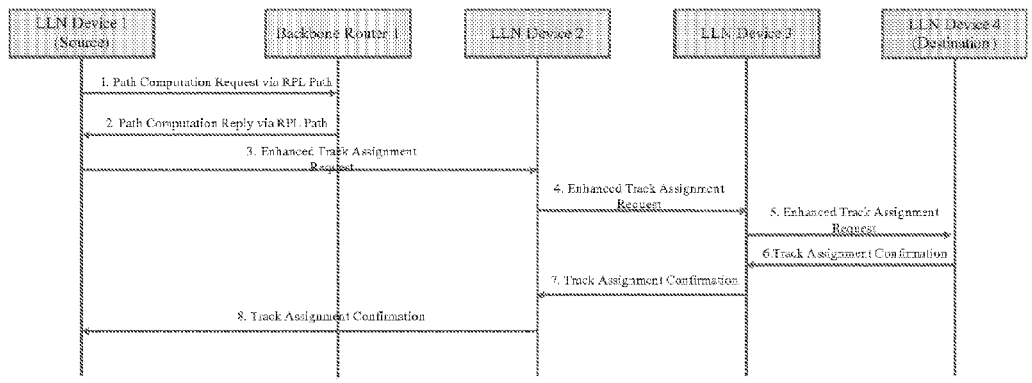
FIG. 13 is a hop by hop track assignment protocol according to yet another embodiment of the application.

In an exemplary embodiment, a hop by hop track reservation procedure is illustrated in FIG. 13. Each of these steps in FIG. 13 is denoted by a numeral. According to Step 1, the source LLN device sends a "Path Computation Request" to the BR. The "Path Computation Request" may include but is not limited to the fields listed in Table 5. In Step 2, the BR calculates the path for the track based on topology information and information in the "Path Computation Request." The BR sends a "Path Computation Reply Message" to the source LLN device. The "Path Computation Reply message" may include but is not limited to the fields provided in Table 6.

Next, the source LLN device 1 sends an enhanced "Track Assignment Request message" to LLN device 2 that includes its unscheduled cells. The enhanced "Track Assignment Request message" may include but is not limited to the fields listed in Table 11 below.

TABLE 11

| Field Name | Description |
| --- | --- |
| Transmitter Address | The IP/MAC address of the LLN device that sends the message. |
| Receiver Address | The IP/MAC address of the LLN devices on the track that receives the message. |
| Track ID | The ID of the track generated by the source. |
| Requested slots | The minimum number of slots requested for each hop of communication on the track. |
| Unscheduled slots info | The Slot Offset of the unscheduled slots of the LLN device. |
| Unscheduled slots info of the LLN device on the previous hop(optional) | The Slot Offset of the unscheduled slots of the LLN device on the previous hop of the track. |

Figure 14:
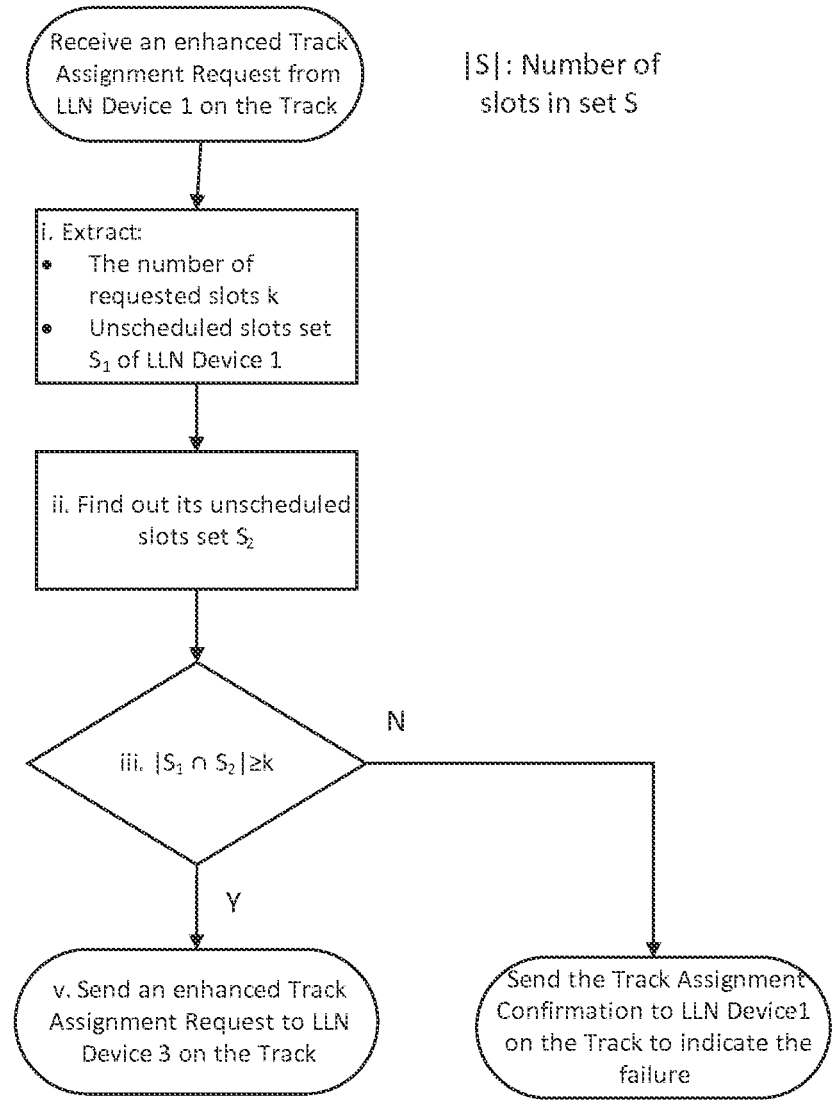
FIG. 14 illustrates a decision protocol for a low-power and lossy device on the track for processing a track assignment request message according to an embodiment of the application.

Next, after receiving the enhanced "Track Assignment Request message," the second LLN device on the Track, e.g., LLN device 2, check whether it has enough unscheduled slots that overlap with the unscheduled slots of LLN device 1. According to an exemplary embodiment, a procedure with $O(min(|S_1|,|S_2|))$ complexity is illustrated in FIG. 14. According to step (i), the LLN device 2 extracts information received from the enhanced "Track Assignment Request message" including for example, the number of requested slots k for the Track, and unscheduled slots info of LLN device 1. Next, in step (ii), the LLN device 2 checks its TSCH schedule and finds out its unscheduled slots $S_2$. Subsequently, in step (iii), the LLN device 2 calculates the number of unscheduled cells that overlap with unscheduled cells of LLN device 1, e.g., $|S_1 \cap S_2|$. Namely, if $|S_1 \cap S_2|$ is smaller than the requested slots k, LLN device 2 will send a "Track Assignment Confirmation message" to LLN device 1 with a Decision field marked as false which indicates LLN device 2 does not have enough resources. Otherwise, LLN device 2 will send an enhanced "Track Assignment Request message" to LLN device 3 that includes the unscheduled cells of LLN device 1 and itself as provided in Table 12 below.

TABLE 12

| Field Name | Description |
| --- | --- |
| Source Address | The IP/MAC address of the source LLN device that sends Track Computation Request. |
| Destination Address | The IP/MAC address of the destination LLN device on the track. |
| Track ID | The ID of the Track generated by the source. |
| Lifetime | The lifetime or duration of the Track. LLN devices can release the resource reserved for a track when the track expires. |
| Requested slots | The minimum number of slots requested for each hop of communication on the track. |
| Unscheduled slots info | The Slot Offset of the all unscheduled slots of the source that can be reserved. |

Figure 15:
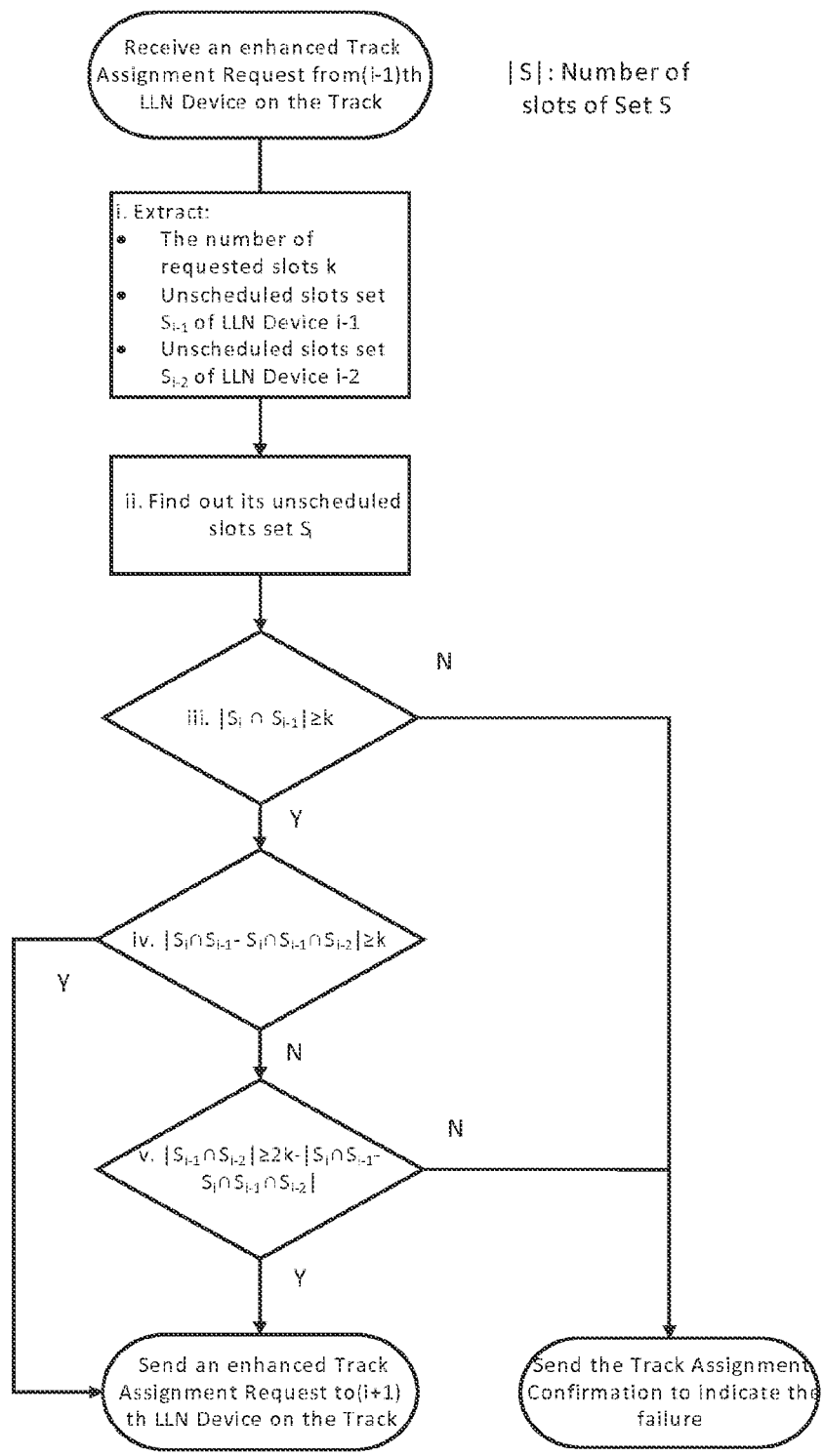
FIG. 15 illustrates a decision protocol for an $i^{th}$ low-power and lossy device on the track for processing a track assignment request message according to an embodiment of the application

In Step 5, and similar to LLN device 2 in Step 4 above, after receiving the enhanced "Track Assignment Request message," the third LLN device on the Track, e.g., LLN device 3, checks if it has enough resources to reserve the track. In an exemplary embodiment as illustrated in FIG. 15, a procedure is provided with complexity $O(\min(|S_1|,|S_2|,|S_3|))$ for LLN device 3 to check if it can allocate k non-overlapped soft cells for Hop between LLN device 1 and LLN device 2, and hops between LLN device 2 and LLN device 3. Namely, in step (i), there is a call for LLN device 3 to extract information received from the enhanced "Track Assignment Request message." The information includes the number of requested slots k for the track, Unscheduled slots info of LLN device 2, and Unscheduled slots info of LLN device 1. In step (ii), LLN device 3 checks its TSCH schedule and finds its unscheduled slots $S_3$. In step (iii), the LLN device 3 checks the number of unscheduled cells that overlap with unscheduled cells of LLN device 2, e.g., $|S_2 \cap S_3|$. If $|S_2 \cap S_3|$ is larger or equal to the requested slots k, LLN device 3 goes to step (iv). Otherwise, it will send a "Track Assignment Confirmation message" to LLN device 2 with a decision field marked as false. This indicates that LLN device 3 does not have enough resources. The "Track Assignment confirmation message" will be forwarded back to the source LLN device. Subsequently, in step (iv), the LLN device 3 checks whether it can allocate soft cells without using overlapped unscheduled slots of LLN devices 1, 2 and 3, e.g., $|S_i \cap S_{i-1} - S_i \cap S_{i-1} \cap S_{i-2}| \geq k$. If so, LLN device 3 will send an enhanced "Track Assignment Request" to LLN device 4 that includes the unscheduled cells of LLN device 2 and itself as provided in Table 12. Otherwise, the process continues to step (v).

Subsequently in Step (v), the LLN device 3 checks if it can allocate k non-overlapped soft cells for a Hop between LLN device 1 and LLN device 2 and/or a Hop between LLN device 2 and LLN device 3. The formula employed for checking is $|S_{i-1} \cap S_{i-2}| \geq 2k - |S_i \cap S_{i-1} - S_i \cap S_{i-1} \cap S_{i-2}|$. If so, LLN device 3 will send an enhanced "Track Assignment Request message" to LLN device 4 that includes the unscheduled cells of LLN device 2 and itself as provided in Table 12. Otherwise, it will send a "Track Assignment Confirmation message" to LLN device 2 with a decision field marked as false as provided in Table 9. This indicates LLN device 2 does not have enough resources after reserving k Soft Cells with LLN device 3. The "Track Assignment confirmation message" will be forwarded back to the source LLN device.

Thereafter, in Step 6, after receiving the enhanced "Track Assignment Request message," the destination LLN device on the track, e.g., LLN device 4, extracts information from the message. The message includes, for example, the number of requested slots k for the track, Unscheduled slot info of LLN device 2, and Unscheduled slot info of LLN device 3. Then, LLN device 4 checks whether it can allocate k non-overlapped Soft Cells for a Hop between LLN device 2 and LLN device 3 and/or a Hop between LLN device 3 and LLN device 4. If this is not possible, it will send a "Track Assignment Confirmation message" to LLN device 3 with a decision field marked as false as provided in Table 9, which indicates LLN device 3 does not have enough resources after reserving k Soft Cells with LLN device 4. Otherwise, LLN device 4 will reserve the k Soft Cells between LLN device 3. LLN device 4 also sends a "Track Assignment Confirmation message" to LLN device 3 with its decision and reserved soft cell information. The "Track Assignment Confirmation message" may include but is not limited to the fields listed in Table 9.

According to Step 7, and similar to LLN device 4 in Step 6, LLN device 3 checks if it can allocate k non-overlapped soft cells for a link between LLN device 1 and LLN device 2 and/or a link between LLN device 2 and LLN device 3. If not, it will send a "Track Assignment Confirmation message" to LLN device 2 immediately with a decision field marked as false as in Table 8, which indicates LLN device 3 does not have enough resources after reserving k soft cells with LLN device 2. Otherwise, LLN device 3 will reserve the k soft cells between LLN device 2 and send a "Track Assignment Confirmation message" to LLN device 2 with its decision and reserved soft cells information. The "Track Assignment Request message" may include but is not limited to the fields listed in Table 8.

Next, and similar as LLN device 4 in Step 6, LLN device 3 will check if it can allocate k soft cells for a link between LLN device 1 and LLN device 2 (Step 8). If not, it will send a "Track Assignment Confirmation message" to LLN device 1 immediately with a decision field marked as false as provided in Table 9 indicating LLN device 2 does not have enough resources after reserving k soft cells with LLN device 1. Otherwise, LLN device 2 will reserve the k soft cells between LLN device 1 and sends a "Track Assignment Confirmation message" to LLN device 1 with its decision and reserved soft cell information. The "Track Assignment Request message" may include but is not limited to the fields listed in Table 8. It is envisaged according to this application that a LLN device may receive a new request from other source LLN devices when it is waiting for the response of a previous request. Moreover, the LLN device may hold the new request until it receives the response from a previous request According to yet another aspect of the application, a new track assignment procedure is described that employs a RPL-assisted hop by hop track assignment procedure using RPL paths to transmit "Track Assignment Messages." By using the RPL path, the interference of the network may be reduced since messages are transmitted using non-overlapped channel selecting a RPL as the default routing algorithm in the 6TiSCH network. Each LLN device has reserved resources to communicate with their parents.

Backbone Router Assisted Track Assignment

According to a further aspect of the application, a BR assisted track assignment scheme is proposed. Namely, the BR is able to determine the information of each LLN device on the track and process the information to assess a feasible soft cell reservation. By contrast with conventional hop by hop track assignment schemes, the BR calculates a path from source to the destination in addition to helping the source reserve resources along the path. The BR also queries the resource of each LLN device on the track path on demand and checks the feasibility to reserve the Track before sending Cell assignment request.

Figure 16:
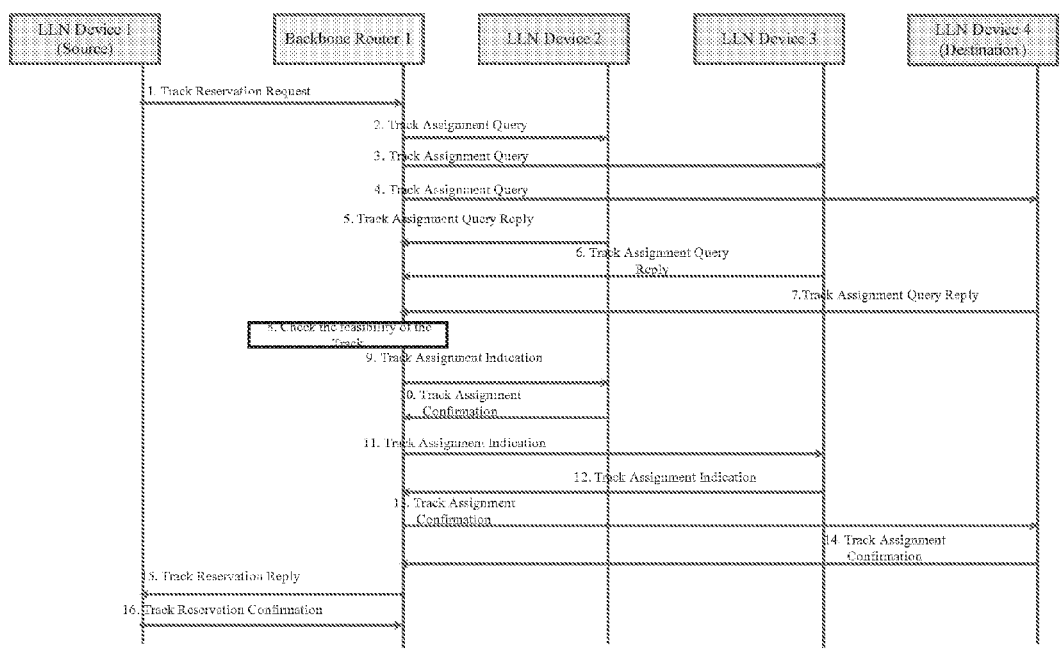
FIG. 16 illustrates a backbone router assisted track assignment scheme.

An exemplary embodiment of the BR assisted track assignment procedure is illustrated in FIG. 16. Each of the steps in FIG. 16 is denoted by a numeral. In Step 1, the source LLN device sends a "Track Reservation Request" to BR. The "Track Reservation Request" may include but is not limited to the fields listed in Table 12. According to Steps 2-4, the BR calculates the path for the track based on the topology information previously described and information in the "Track Reservation Request." The BR unicasts a "Track Assignment Query message" to all LLN devices on the track except for the source LLN device to obtain unscheduled slots of these LLN devices. Thereafter, each LLN device that receives the "Track Assignment Query message" sends a "Track Assignment Query Reply message" to BR to report its unscheduled slots (Step 5-7). The "Track Assignment Query Reply message" may include but is not limited to the fields provided in Table 13 below.

TABLE 13

| Fields Name | Description |
| --- | --- |
| Reporting Address | The IP/MAC address of the LLN device that sends Track Assignment Query Reply. |
| All unscheduled slots info | The Slot Offset of the all its unscheduled slots. |

According to Step 8, the BR will check if it can reserve requested slots along the path. If the BR cannot, it will calculate another path and return to Steps 2-8 as previously discussed. Otherwise, the BR fulfils the following steps. Namely, according to Steps 9, 11 and 13, the BR will send a "Track Assignment Indication" to all LLN devices on the track. In particular, the "Cell Assignment Request message" may include but is not limited to fields provided in Table 14 below.

TABLE 14

| Field Name | Description |
| --- | --- |
| Track ID | The ID of the track |
| Source address | The source address of the track |
| Lifetime | The lifetime or duration of the track. LLN devices can release the resource reserved for a track when the track expires. |
| Device address | The IP/MAC address of the LLN device to be configured. |
| Address of the previous hop | The IP/MAC address of the LLN device that is the previous hop on the track. |
| Income Cells information | The Timeslot Offset, Channel Offset of cells that are used to receive packets from previous hop. |
| Address of the next hop | The IP/MAC address of the LLN device that is the next hop on the track. |
| Outgoing Cells information | The Timeslot Offset, Channel Offset of cells that are used to send packets to the next hop. |

According to Steps 10, 12 and 14, the LLN devices which receive the "Track Assignment Indication Message" will send a "Track Assignment Confirmation message" to the BR to confirm the reserved cells. Thereafter, the BR will send a "Track Reservation Reply Message" to the source LLN device to indicate the results of the track reservation procedure (Step 15). The "Cell Assignment Request message" may include but is not limited to fields Table 15 below. If the BR has reserved resources for all LLN devices on the track except the source LLN device, it will mark the decision field as a success and contain the reserved cell information. Further, in Step 16, the source LLN device that receives the "Track Reservation Reply Message" will send a "Track Assignment Confirmation message" to the BR to confirm the reserved cells.

TABLE 15

| Field Name | Description |
| --- | --- |
| Source address | The source address of the track |
| Track ID | The ID of the track |
| Decision | The result of the track reservation procedure |
| Source address | The IP/MAC address of the source LLN device on the track |
| Next hop address (optional) | The IP/MAC address of the next hop LLN device on the track |
| Outgoing Cells (optional) | The Timeslot Offset and Channel Offset of Cells that are used to send packets to the next hop. |

Neighbor Information Option in RPL

According to another embodiment of the application, there is described a method of inserting the proposed neighbor information in the DAO messages sent by LLN devices. By so doing, existing Transmit Information option proceeded by RPL Target option may be updated and/or replaced. The descriptions for each field are provided below in Table 16. It is envisaged according to this application that the proposed neighbor information option may also contain multiple pairs of Neighbor Lifetime and Neighbor Address information.

TABLE 16

| Field Name | Description |
| --- | --- |
| Option Type | Always set to an unreserved value range from 0x0a-0xff, e.g. 0x0a. |
| Option Length | Variable, indicate the length of the option. |
| Parent (P) | 1-bit flag. The 'P' flag is set to indicate if the neighbor is also a parent of the LLN device. |
| Flags | The 7 bits remaining unused in the Flags field are reserved for flags. |
| Neighbor Sequence | 8-bit unsigned integer. When a RPL Target option is issued by the node that owns the Target prefix, e.g., in a DAO message, that node sets the Neighbor Sequence and increments the Neighbor Sequence each time it issues a RPL Target option with updated information. |
| Neighbor Lifetime | 8-bit unsigned integer. The length of time in Lifetime Units that the Neighbor is valid. |
| Neighbor Address | IPv6 address of the neighbor of the node originally issuing the Transit Information option. |

ICMPv6 6TiSCH Control Messages

Figure 17:
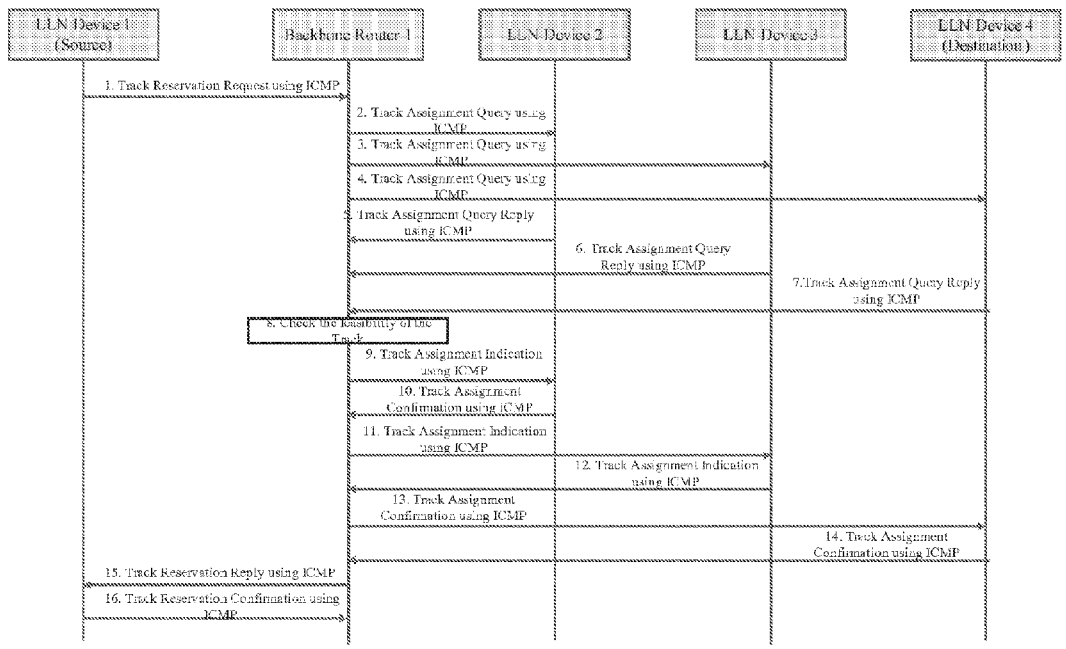
FIG. 17 illustrates a track assignment scheme using ICMPv6 according to an embodiment of the application.

According to a further embodiment of the application, the 6TiSCH control messages used within 6TiSCH network may be carried by the ICMPv6 message. According to FIG. 17, an embodiment using ICMPv6 6TiSCH Control Messages to transmit messages in a BR assisted track assignment scheme is described above. The Code and Message are described in Table 17 below. A 6TiSCH control message may be implemented as an ICMPv6 information message with a Type of 159. The Code field identifies the type of 6TiSCH control message as shown in Table 17. The fields of each message are provided in the ICMPv6 message payload.

TABLE 17

| Code | Message |
| --- | --- |
| 0x01 | Path Computation Request Message. |
| 0x02 | Path Computation Reply Message. |

TABLE 17-continued

| Code | Message |
|------|---------|
| 0x03 | Track Assignment Request Message. |
| 0x04 | Track Assignment Confirmation Message. |
| 0x05 | Track Assignment Reply Message. |
| 0x06 | Track Reservation Request Message. |
| 0x07 | Track Reservation Reply Message. |
| 0x08 | Track Assignment Query Message. |
| 0x09 | Track Assignment Query Reply Message. |
| 0x0a | Track Assignment Indication Message. |

6TiSCH Control Messages in 802.15.4e Information Element

According to another embodiment, the proposed 6TiSCH control messages as previously discussed may be carried by a 802.15.4e header as a payload Information Element (IE) if the destination of the message is one hop away from the sender. The fields in 6TiSCH Control IE are described in Table 18 to transmit one hop enhanced "Track Assignment Requests" and "Track Assignment Confirmation messages" in an "Enhanced Hop by Hop Track Assignment Scheme" as discussed above in the present application.

TABLE 18

| Field Name | Description |
|------------|-------------|
| Length | The length of the IE. |
| Group ID | The Group ID can be set as an unreserved value between 0x2-0x9, e.g. 0x2. |
| T | Set to 1 to indicate this is a long format packet. |
| 6TiSCH Control Message Code | This field indicates the type of the 6TiSCH control messages. The message code and type mapping can be the same as in Table 17. |
| 6TiSCH Control Message Fields | The fields of each 6TiSCH control messages. |

6TiSCH Control Messages in CoAP

Figure 18:
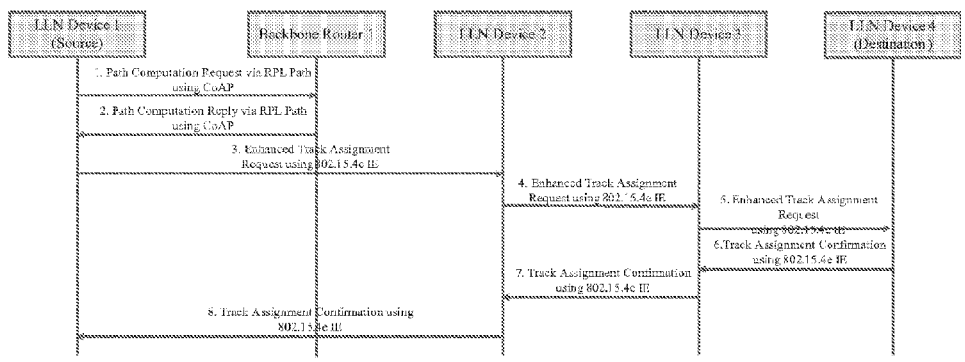
FIG. 18 illustrates a track assignment scheme using a 802.15.43 informational element and constrained application protocol.

According to yet even a further embodiment, 6TiSCH Control Messages may also be transmitted using CoAP. Namely, each control message has an associated URI path as defined in Table 19 below and/or LLN devices. To send a control message to a destination, the sender needs to issue a RESTful method, e.g., POST method, to the destination with the address set to the corresponding URI path. The destination maintains the corresponding URI path. FIG. 18 is an illustrative embodiment using CoAP to transmit a multi-hop Path Computation Request and Path Computation Replay messages in "Enhanced Hop by Hop Track Assignment Scheme" described in above in the present application.

TABLE 19

| 6TiSCH Control Message | CoAP Resource | URI path |
|------------------------|---------------|----------|
| Path Computation Request Message | Path Request | /PathRequest |
| Path Computation Reply Message | Path Reply | /PathReply |
| Track Assignment Request Message | Track Request | /TrackRequest |
| Track Assignment Confirmation Message | Track Confirm | /TrackConfirm |
| Track Assignment Reply Message | Track Reply | /TrackReply |
| Track Reservation Request Message | Track Reservation | /TrackReservation |
| Track Reservation Reply Message | Track Reservation Reply | /TrackReservationReply |
| Track Assignment Query Message | Track Query | /TrackQuery |
| Track Assignment Query Reply Message | Track Query Reply | /TrackQueryReply |
| Track Assignment Indication Message | Track Assignment Indication | /TrackAssigmentIndication |

According to yet another aspect of the application, non-transitory computer-readable or executable storage medium for storing computer-readable or executable instructions is disclosed. The medium may include one or more computer-executable instructions such as disclosed above in the plural call flows according to FIGS. 9, 10, 12, 13, 16, 17 and 18. The computer executable instructions may be executed by a processor, such as the processor disclosed above that is employed in devices including LLN devices and BRs. The processor is configured to perform the instructions of: (i) sending a path computation request to a backbone router via a routing protocol path; (ii) receiving a computation reply from the backbone router via the routing protocol path based upon the request; and (iii) assigning a soft cell on the track between the source and the destination device.

While the systems and methods have been described in terms of what are presently considered to be specific aspects, the application need not be limited to the disclosed aspects. It is intended to cover various modifications and similar arrangements included within the spirit and scope of the claims, the scope of which should be accorded the broadest interpretation so as to encompass all such modifications and similar structures. The present disclosure includes any and all aspects of the following claims.

What is claimed is:

1. A computer-implemented device comprising:
a non-transitory memory having instructions stored thereon for reserving a path in a network and including information of a transmitter address, a receiver address, a source address, path identification, lifetime, address of the intermediate device, requested slots, unscheduled slot information, a decision, and confirmed cell information; and
a processor, operably coupled to the memory, the processor configured to perform the instructions of:
sending a path computation request to a backbone router via a routing protocol path;
receiving a computation reply from the backbone router path based upon the request; and
assigning a soft cell on the path between the source and the destination device.

2. The device of claim 1, wherein the processor is further configured to perform the instructions of sending topology information including neighbor addresses to the backbone router.

3. The device of claim 1, wherein a soft cell is sequentially reserved between the source device, an intermediate device and the destination device.

4. The device of claim 1, wherein the assigning step includes:
sending a path assignment request message to an intermediate device; and
receiving a path assignment confirmation from the intermediate device.

5. The device of claim 4, wherein the assigning step further includes receiving a path assignment reply from the destination device.

6. The device of claim 4, wherein the path assignment request message or the path assignment confirmation includes a field selected from a transmitter address, a receiver address, a source address, path identification, lifetime, address of the intermediate device, requested slots, unscheduled slot information, a decision, confirmed cell information and combinations thereof.

7. The device of claim 6, wherein the path assignment reply includes a field selected from a transmitter address, a receiver address, a source address, a path ID, a decision, an address of failure devices along the path and combinations thereof.

8. A computer-implemented device comprising:
a non-transitory memory having instructions stored thereon for reserving a path in a network and including information of a transmitter address, a receiver address, a source address, path identification, lifetime, address of the intermediate device, requested slots, unscheduled slot information, a decision, and confirmed cell information; and
a processor, operably coupled to the memory, the processor configured to perform the instructions of:
receiving a path reservation request from the source device to reserve soft cells along the path;
sending a unicast path assignment query message to an intermediate device and the destination device on the path to obtain unscheduled slot information;
receiving a path assignment query reply message from the intermediate device and the destination device on the path; and
a transceiver for sending and receiving data.

9. The device of claim 8, wherein the processor is further configured to perform the instructions of determining feasibility for reserving the path based upon information in the path reservation request and the received path assignment query reply messages.

10. The device of claim 9, wherein the processor is further configured to perform the instructions of:
sending a path assignment indication message to the intermediate and destination devices; and
receiving a path assignment confirmation from the intermediate and destination devices.

11. The device of claim 10, wherein the processor is further configured to perform the instructions of:
sending a path reservation reply to the source device; and
receiving a path reservation confirmation from the source device confirming the soft cells.

12. The device of claim 11, further comprising:
receiving a path assignment confirmation message from the intermediate device in the path indicating an acceptable or unacceptable allocation of non-overlapped soft cells.

13. A computer-implemented device comprising:
a non-transitory memory having instructions stored thereon for reserving a path between a source and a destination device and including information of a transmitter address, a receiver address, a source address, path identification, lifetime, address of the intermediate device, requested slots, unscheduled slot information, a decision, and confirmed cell information; and
a processor, operably coupled to the memory, the processor configured to perform the instructions of:
receiving a path reservation request from the source device to reserve soft cells along the path;
sending a unicast path assignment query message to an intermediate device and the destination device on the path to obtain unscheduled slot information;
receiving a path assignment query reply message from the intermediate device and the destination device on the path; and
determining feasibility for reserving the path based upon information in the path reservation request and the received path assignment query reply messages.

14. The method of claim 13, further comprising:
sending a path assignment indication message to the intermediate and destination devices; and
receiving a path assignment confirmation from the intermediate and destination devices.

15. The method of claim 13, further comprising:
sending a path reservation reply to the source device; and
receiving a path reservation confirmation from the source device confirming the soft cells.

16. A computer-implemented method for reserving a path between a source and a destination device comprising:
providing a source device;
sending a path computation request to a backbone router via a routing protocol path;
receiving a computation reply from the backbone router based upon the request; and
assigning a soft cell on the path between the source and the destination device,
wherein the source device includes a non-transitory memory including information of a transmitter address, a receiver address, a source address, path identification, lifetime, address of the intermediate device, requested slots, unscheduled slot information, a decision, and confirmed cell information.

17. A computer-implemented method for reserving a path between a source and a destination device comprising:
providing a source device;
sending a path computation request from the source device to a backbone router via a routing protocol path;
receiving a computation reply from the backbone router based upon the request;
sending a path assignment request to the destination device including unscheduled slot information of intermediate devices in the path; and
receiving a path assignment confirmation message from the destination device indicating an acceptable allocation of non-overlapped soft cells,
wherein the source device includes a non-transitory memory including information of a transmitter address, a receiver address, a source address, path identification, lifetime, address of the intermediate device, requested slots, unscheduled slot information, a decision, and confirmed cell information.

18. A computer-implemented method for reserving a path between a source and a destination device comprising:
receiving a path reservation request from the source device to reserve soft cells along the path;
sending a unicast path assignment query message to an intermediate device and the destination device on the path to obtain unscheduled slot information;
receiving a path assignment query reply message from the intermediate device and the destination device on the path;
determining feasibility for reserving the path based upon information in the path reservation request and the received path assignment query reply messages;
sending a path assignment indication message to the intermediate and destination devices; and receiving a path assignment confirmation from the intermediate and destination devices,
wherein the source device includes a non-transitory memory including information of a transmitter address, a receiver address, a source address, path identification, lifetime, address of the intermediate device, requested slots, unscheduled slot information, a decision, and confirmed cell information.

19. The method of claim 18, further comprising:
sending a path reservation reply to the source device; and
receiving a path reservation confirmation from the source device confirming the soft cells.

* * * * *